(12) United States Patent
Auxer et al.

(10) Patent No.: US 10,341,735 B2
(45) Date of Patent: Jul. 2, 2019

(54) SYSTEMS AND METHODS FOR SHARING CONTENT SERVICE PROVIDER SUBSCRIPTIONS

(71) Applicant: Rovi Guides, Inc., San Carlos, CA (US)

(72) Inventors: Gregory Alan Auxer, Exton, PA (US); Scott Manning, Lansdowne, PA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 15/804,072

(22) Filed: Nov. 6, 2017

(65) Prior Publication Data
US 2019/0141399 A1    May 9, 2019

(51) Int. Cl.
| | |
|---|---|
| H04N 21/478 | (2011.01) |
| H04N 21/475 | (2011.01) |
| H04N 21/472 | (2011.01) |
| H04N 21/482 | (2011.01) |
| H04L 29/06 | (2006.01) |
| G06F 16/435 | (2019.01) |
| G06Q 50/00 | (2012.01) |

(52) U.S. Cl.
CPC ......... *H04N 21/478* (2013.01); *G06F 16/435* (2019.01); *G06Q 50/01* (2013.01); *H04L 63/102* (2013.01); *H04N 21/472* (2013.01); *H04N 21/4753* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,856,833 B2* | 10/2014 | Conness | H04N 5/44543 |
| | | | 725/45 |
| 2002/0174430 A1 | 11/2002 | Ellis et al. | |
| 2005/0251827 A1 | 11/2005 | Ellis et al. | |
| 2009/0133070 A1 | 5/2009 | Hamano | |
| 2010/0153885 A1 | 6/2010 | Yates | |
| 2011/0238754 A1 | 9/2011 | Dasilva | |
| 2015/0234820 A1 | 8/2015 | Aravamudan | |

OTHER PUBLICATIONS

U.S. Appl. No. 15/804,036, filed Nov. 6, 2017, Gregory Alan Auxer.

* cited by examiner

*Primary Examiner* — Hsiungfei Peng
*Assistant Examiner* — Fred Peng
(74) *Attorney, Agent, or Firm* — Haley Guiliano LLP

(57) ABSTRACT

Systems and methods are described for a media guidance application (e.g., implemented on a user device) for sharing content service provider subscriptions for user-selected media assets. The media guidance application may receive a media asset selection from the user and provide options to share subscriptions from the user's friends to allow the user to access the media asset.

20 Claims, 12 Drawing Sheets

SYSTEMS AND METHODS FOR SHARING CONTENT SERVICE PROVIDER SUBSCRIPTIONS

BACKGROUND

The amount of media available to users in any given media delivery system can be substantial. Unfortunately, the media is also dispersed across multiple subscription services and is not immediately available to users. Unless users subscribe to all subscription services, the media may be out of reach entirely. Not to mention, purchasing subscriptions to all subscription services is not cost effective because the user may be interested in only one media asset (e.g., movie, song, game, etc.) of the subscription service's library, and thus may not want to purchase access for all media assets in the library.

SUMMARY

Systems and methods are described herein for sharing content service provider subscriptions for media asset recommendations. Consider a scenario in which a user is interested in watching the movie "Jurassic Park." However, the user may only have subscriptions to Amazon Prime Video and Hulu, two subscription services that do not have "Jurassic Park" in their respective video library. The media guidance application may determine that a friend from the user's social media has a subscription to Netflix. Furthermore, the media guidance application may determine that "Jurassic Park" is in the Netflix video library. In response, the media guidance application may request the user's friend for access credentials to Netflix, in order to allow the user to view "Jurassic Park." If the user's friend chooses to share access credentials, the user may thus be able to view "Jurassic Park" without separately purchasing a Netflix subscription.

The media guidance application may generate for display to a user a media asset identifier corresponding to a media asset indicated by a viewing history of a friend, the media asset being accessible through the subscription service. For example, the media guidance application may identify a friend of a user from the user's social media data. The media guidance application may retrieve the friends' viewing history, and determine a media asset (e.g., movie, game, song) that is present in the viewing history. Furthermore, the media guidance application may identify a media asset in the viewing history, such as the movie "Jurassic Park," and determine that "Jurassic Park" is accessible on Netflix. The media guidance application may determine from the user's user profile that the user does not subscribe to Netflix.

In response to determining that the user does not subscribe to the subscription service, the media guidance application may request permission from the friend for the user to share an account of the friend that is registered to the subscription service. For example, the media guidance application may generate, on the friend's local device, a request to allow the user access to the friend's Netflix account. Suppose that the friend accepts the request. In response to receiving the permission from the friend, the media guidance application may retrieve the media asset from a database provided by the subscription service, using access credentials of the account of the friend. For example, the media guidance application may retrieve "Jurassic Park" from the Netflix movie database, using the friend's access credentials, to display the movie on the user's local device.

In some aspects, the media guidance application may receive a request from a user to view media asset recommendations. For example, the user may desire to view a media asset (e.g., a movie or song). In response to receiving the request, the media guidance application may retrieve a viewing history of a friend of the user (e.g., the media guidance application recommends a media asset accessed by the user's friend). For example, the media guidance application may refer to a viewing history database on a server. The viewing history database may contain information such as the names of media assets accessed by a user, time stamps of when the media asset was accessed, the subscription service streaming the media asset, along with the device used for access. Each user may have his/her own separate table within the viewing history database that lists this information respective to the user. Furthermore, the viewing history database may link users if the users are friends. For example, the viewing history database may feature a viewing history table of viewer A, the user. Suppose that viewer A is friends with viewer B and viewer C. The viewing history database may include a friends table associated with viewer A that lists viewer B and viewer C. Thus, the media guidance application may refer to the viewing history database, retrieve the friends table of viewer A, identify viewer B in the friends table, and retrieve the viewing history table of viewer B. The media guidance application may generate the friends table based on the social media interactions of the user. The user may also identify friends that he/she is associated with. It should be noted that the viewing history table and friends table of each user may remain private to the respective user if the user does not wish to share that information.

In terms of the server, multiple servers can be used in combination rather than one server. The server can be any device that provides a service, such as file retrieval, for a client, such as the user's local device. The server can be connected to the user's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely.

The media guidance application may generate for display a media asset identifier corresponding to a media asset indicated by the viewing history, wherein the media asset identifier indicates a subscription service used by the friend to view the media asset. Suppose that the user desires to view the movie "Jurassic Park." The media guidance application may refer to the viewing history database and retrieve the user's friends table. The friends table may list viewer B and viewer C as friends. The media guidance application may identify viewer B and retrieve his viewing history table. Suppose that the viewing history table of viewer B includes "Jurassic Park," and further indicates that the media asset was accessed by viewer B through the subscription service, Netflix. The media guidance application may generate for display on a user's local device, a media asset identifier, such as the Netflix logo, that indicates the subscription service used by viewer B, to view "Jurassic Park."

The media guidance application may receive a selection by the user of the media asset identifier. For example, the user may select the media asset identifier (e.g., click on the Netflix logo). In response, the media guidance application may access a list of subscription services with which the user has an account registered. The media guidance application may refer to a user profile to retrieve the subscription services that the user has subscribed to. For example, the user profile may indicate that the user only has accounts registered with Amazon Prime Video and Hulu. Therefore, the user does not have an account registered with Netflix.

The media guidance application may search content available from each subscription service in the list of subscription services to determine whether the content includes the media asset associated with the selected media asset identifier. For example, the media guidance application may retrieve library information about each subscription service in the list of subscription services from the Internet. The library information may include a list of all media assets that are accessible to users that possess registered accounts with the subscription service. For example, the media guidance application may retrieve a list of media assets accessible on Amazon Prime Video. The media guidance application may further search for "Jurassic Park" in the list of media assets accessible on Amazon Prime Video.

In response to determining that the content available from each subscription service in the list of subscription services does not include the media asset, the media guidance application may transmit a prompt to the friend with a selectable option for permitting the user to share an account of the friend that is registered to the subscription service. For example, the media guidance application may determine that "Jurassic Park" is also not available on Hulu, the second subscription service in the user's list of subscription services. Accordingly, the media guidance application may conclude that the user cannot access the media asset on his/her subscription services. The media guidance application may prompt viewer B, on a local device accessed by viewer B, requesting permission to share the account of viewer B that is registered with the subscription service used to access the media asset. For example, the media guidance application may prompt viewer B with a selectable option that allows the user to access "Jurassic Park" on viewer B's Netflix account.

Suppose that viewer B decides to share his Netflix account with the user. Viewer B may therefore select the selectable option to permit the user to access viewer B's registered account with the subscription service. The media guidance application, on the user's local device, may then receive this selection of the selectable option.

In response to receiving the selection of the selectable option, the media guidance application may retrieve the media asset from a database provided by the subscription service using access credentials corresponding to the account of the friend and generate, for display, the media asset to the user. For example, upon receiving permission from viewer B to let the user share viewer B's Netflix account, the media guidance application may retrieve "Jurassic Park" from Netflix's movie database and present it to the user for viewing on the user's local device. It should be noted that viewer B's access credentials, including username and password, are not shared with the user and remain private to viewer B. In some embodiments, multiple friends of the user may subscribe to a subscription service that provides access to the media asset. Therefore, the media guidance application may request all friends for permission. However, the media guidance application may only utilize the access credentials of the friend with the quickest response.

In some aspects, the media guidance application may receive a request from a user to view a plurality of media asset identifiers. For the example, the user may request to viewer media asset identifiers that represent various movies. In this case, the media asset identifier may be a poster of movie, album art of a song, or cover of a game. The media asset identifier may also simply be the name of the media asset.

The media guidance application may then receive a selection by the user of a media asset identifier of the plurality of media asset identifiers. Suppose that the user chooses to view "Jurassic Park" and selects a "Jurassic Park" movie poster, which is the media asset identifier.

The media guidance application may access a first list of subscription services with which the user has an account registered. For example, the media guidance application may refer to a user profile that contains a list indicating the subscription services that the user is subscribed to. The list may include Amazon Prime Video and Hulu, thus indicating that the user has accounts registered with the two subscription services.

The media guidance application may search content available from each subscription service in the first list of subscription services to determine whether the content includes a media asset associated with the selected media asset identifier. Suppose that the media asset is the movie "Jurassic Park." The media guidance application may retrieve library information about each subscription service in the list of subscription services from the Internet. The library information may include a list of all media assets that are accessible to users with registered accounts with the subscription service. For example, the media guidance application may retrieve a list of media assets accessible on Amazon Prime Video. The media guidance application may then search for "Jurassic Park" in the list of media assets accessible on Amazon Prime Video. The media guidance application may repeat this process for Hulu, the second subscription service that the user has an account registered with.

In response to determining that the content available from each subscription service in the first list of subscription services does not include the media asset, the media guidance application may access a second list of subscription services with which a friend, with whom the user is connected by way of a social network platform, has an account registered. For example, the media guidance application may determine that "Jurassic Park" is not in the content available in Amazon Prime Video or Hulu. As a result, the media guidance application may refer to the viewing history database, which includes information about the viewing history of users and information about each user's friends. The viewing history database may also include a list of subscription services for each user. The list of subscription services in the viewing history database may be updated from the list of subscription services stored locally in the user profile of the user's device. The media guidance application may identify a friend from the user's friends table in the viewing history database. For example, the media guidance application may identify viewer B and retrieve viewer B's list of subscription services. Suppose that viewer B's list of subscription services includes the services, Netflix and Epic.

The media guidance application may search content available from each subscription service in the second list of subscription services to determine whether the content includes the media. For example, the media guidance application may retrieve a list of media assets associated with the subscription services in the second list from the Internet. In this case, the media guidance application may retrieve the list of media assets accessible on Netflix and the list of media assets accessible on Epic. The media guidance application may search for "Jurassic Park" in each respective second list.

In response to determining that the content available from a given subscription service in the second list of subscription services includes the media asset, the media guidance application may generate for display to the user, a selectable option to query the friend for access to the given subscription service. For example, the media guidance application may determine that "Jurassic Park" is accessible on Netflix. The media guidance application may inform the user that viewer B has a subscription to Netflix and generate a selectable option to query whether the user wants to request permission, from viewer B, to share the subscription to Netflix.

In response to receiving a selection from the user of the selectable option to query the friend for access, the media guidance application may receive from the friend, access credentials, corresponding to the account of the friend with the given subscription service to authorize the user to access the media asset through the account with the given subscription service. For example, the media guidance application may generate a selectable option for viewer B to share the access credentials associated with Netflix with the user's local device. In the case that viewer B decides to share his Netflix account with the user, viewer B may select the selectable option to permit the user to access viewer B's registered account with the subscription service (e.g., share access credentials with the user's local device). The media guidance application, on the user's local device, may then receive this selection of the selectable option.

In some embodiments, the media guidance application may determine that the friend of the user does not subscribe to any of the subscription services that provide access to the media asset. However, the media guidance application may determine that the viewing history database indicates that the friend viewed the media asset on broadcast television. For example, the friend may have seen "Jurassic Park" when it was transmitted on the FOX, a television channel. The media guidance application on the user's device may query the media guidance application on the friend's device to determine if the friend captured the media asset on through a digital video recorder (e.g., TiVo). The media guidance application on the friend's device may search through the saved media assets in the friend's device for the media asset requested by the user. Upon finding the media asset, the media guidance application on the friend's device may generate a prompt on the friend's device requesting permission to send the stored media asset to the user. If the friend accepts the request, the media guidance application on the friend's device may send the media asset to the user's device.

The media guidance application on the user's device may then generate for display to the user, the media asset based on receiving the access credentials from the friend. Upon receiving access credentials, the media guidance application may retrieve "Jurassic Park" from Netflix's movie database and present it to the user for viewing on the user's local device. It should be noted that viewer B's access credentials, including username and password, are not shared with the user and remain private to viewer B.

In both aspects described previously, the media guidance application may generate a display that includes a plurality of regions. The display may be a user interface wherein a first of the regions includes an access credentials input component for receiving user input of one or more access credentials corresponding to one or more subscription services. For example, the first of the regions may allow the user to insert access credentials to "login" and access an account associated with a subscription service. The access credentials may be a username and a password combination. In some embodiments, the media guidance application may store the access credentials in a credentials database and may list the accounts accessible to the user in the first of the regions. For example, the first of the regions may include a dropdown menu that lists several accounts associated with their respective access credentials. The user may select the accounts that he/she wishes to access. For example, the dropdown menu may list three accounts associated with the user, viewer A, and viewer B. The media guidance application may receive user input to select one of the accounts listed (e.g., Hulu) and the associated access credentials. The media guidance application may then retrieve the access credentials from the credentials database.

The media guidance application may include a second of the regions, which includes a content provider component representing a set of subscription services currently being accessed by one or more friends of the user. For example, the second of the regions may list content providers associated with subscription services being accessed by friend(s) of the user. Suppose that the subscription services being accessed by the user's friends, as listed in the viewing history database, are Netflix, Amazon Prime Video, Hulu, Spotify, HBO Now, and cable. The content providers of these subscription services may be Netflix, Amazon, Hulu, Spotify, HBO, and TiVo respectively. The media guidance application may retrieve the names of the content providers, and list them in the second of the regions.

A third of the regions may include a time component for receiving user input selecting a threshold time period and a most-watched component representing a set of media assets that one or more friends of the user have viewed within the threshold time period. The threshold time period may be a specific window of time (e.g., past day, past week, between Oct. 1, 2017 and Oct. 15, 2017, etc.) for which the media guidance application may determine the most watched media assets among the user's friends. For example, the media guidance application may receive user input to set the threshold time period to "this past week." Accordingly, the media guidance application may determine the media assets viewed by the friends of the user between the current time and a week prior. Upon generating a list of the most viewed media assets based on the viewing history database, and determining the users that watched the viewed the media assets, the media guidance application may display the list in the third of the regions. The media guidance application may also list a number representing how many of the one or more friends viewed a same one of the media assets, and identifiers of the one or more friends. For example, the media guidance application may determine how many friends viewed a media asset and list the number in third of the regions, alongside the media asset name and identifiers (e.g., names, profile pictures) of the user's friends.

A fourth of the regions includes a way-to-watch component representing a subset of the set of subscription services from which the media asset is accessible. Suppose the user wishes to select one of the media assets listed in the third of the regions. The media guidance application may receive user input selecting one of the media assets. In response, the media guidance application may list a set of subscription services that include the media asset in their database (e.g., library of content). For example, the user may desire to watch "Jurassic Park," and the media guidance application may list Netflix and HBO Now as subscription services which include "Jurassic Park" in their respective movie database.

In some embodiments, searching the content available from each subscription service in the list of subscription services is performed in response to receiving a user selection of a given subscription service from the way-to-watch component. For example, the media guidance application may receive a user selection of Netflix, a subscription service that may be listed in the way-to-watch component of the fourth of the regions, to access "Jurassic Park." In response, the media guidance application may determine whether "Jurassic Park" is part of the Netflix movie database by retrieving a list of media assets offered by Netflix from the Internet and searching for "Jurassic Park" in the list of media assets.

In some embodiments, the media guidance application may access a viewing history of the user. The media guidance application may compare the viewing history of the user to viewing histories associated with each of the one or more friends. For example, the media guidance application may refer to the viewing history database of all users and compare the viewing history of the user, with the viewing histories of his/her friends. Based on the comparing, the media guidance application may populate the most-watched component by identifying media assets in the viewing histories of the one or more friends for which there is no matching media asset in the viewing history of the user. For example, the user may have "Iron Man," "Spiderman," and "Batman Begins." Suppose that the user has one friend with a viewing history that includes "Iron Man," "Jurassic Park," and "Spiderman." In this example, the user has not viewed "Jurassic Park," a movie listed in the friend's history. Therefore, the most-watched component may only include "Jurassic Park," to avoid redundancy in the user's most-watched component.

In some embodiments, the media guidance application may determine which of the subset of the set of subscription services the user has a registered account. The subset of the set of subscription services corresponds to the way-to-watch component. The media guidance application may thus determine from the user's credentials database, the access credentials the user has. The media guidance application may generate a first group of the subset of the set of subscription services representing subscription services the user has a registered account and a second group of the subset of the set of subscription services representing subscription services the user does not have a registered account.

The media guidance application may position the first group above the second group in the fourth of the regions. For example, the subset of the set of subscription services may include Netflix, Amazon Prime Video, Hulu and HBO Now. The media guidance application may determine that the user only has access credentials for Amazon Prime Video and Hulu, based on the credentials database. Accordingly, the media guidance application may place Amazon Prime Video and Hulu, the first group, above Netflix and HBO Now, the second group.

In some embodiments, the media guidance application may receive first access credentials associated with a first user via the first of the regions, the first access credentials corresponding to a first account on a first of the subscription services. For example, the media guidance application may receive access credentials (e.g., username and password) associated with a first account (e.g., the first user's account on the local device) on a first subscription service (e.g., Amazon Prime Video). Additionally, the media guidance application may receive second access credentials associated with a second user via the first of the regions, the second access credentials corresponding to a second account on a second of the subscription services. For example, the media guidance application may receive access credentials (e.g., username and password) associated with a second account on a second subscription service (e.g., Netflix). It should be noted that the first account may belong to the user and the second account may belong to the user's friend who is accessing his/her account on the same device as the user. The media guidance application may receive combination criterion specifying a manner of combining profiles associated with the first and second accounts via the first of the regions. In this case, the media guidance application would generate the third of the regions based on a combination of friends, preferences and viewing history, of the users. The users may also adjust logic settings of the media guidance application. The logic settings may be adjustable OR, AND, ONLY values for different criteria. For example, the logic setting for which friends to consider when generating the most-watched component may be "friends of first user AND second user." In this case, the media guidance application may retrieve the viewing histories of all shared/mutual friends of the two users to determine view counts and subscription services. Alternatively, the logic setting "friends of first user OR second user" allows the media guidance application to consider all friends associated with the two users to determine view counts and subscription services. The logic setting "friends of first user ONLY" allows the media guidance application to consider only the friends of the first user to determine view counts and subscription services.

The logic settings may also be adjustable for the media assets viewed. For example, when presenting the most-watched media assets in the third of the regions, if the logic setting states "ignore media assets viewed by first user AND second user," the media guidance application will not show the media assets in the most-watched component that both users have already viewed. If the logic setting states "ignore media assets viewed by first user OR second user," the media guidance application will not show the media assets in the most-watched component that at least one of the users has viewed. If the logic setting states "ignore media assets viewed by first user ONLY," the media guidance application will not show the media assets in the most-watched component that the first user has already viewed.

In some embodiments, the media guidance application may generate a first group of the subset of the set of subscription services representing subscription services with which a majority of the one or more friends has a registered account and a second group of the subset of the set of subscription services representing subscription services with which a minority of the one or more friends has a registered account. The media guidance application may position the first group relative to the second group in the fourth of the regions. For example, the media guidance application may determine that the user has five friends listed in the user's friends table of the viewing history database. The media guidance application may determine that the at least three of the friends (e.g., the majority) accessed the media asset (e.g., Jurassic Park) using Netflix and Hulu, subscription services in the subset. Therefore, the media guidance application may identify Netflix and Hulu as the first group and the remaining subscription services in the subset as the second group. When generating the fourth of the regions for display, the media guidance application may place the first group above the second group.

In some embodiments, the media guidance application may generate a first group of the set of subscription services representing subscription services with which a majority of the one or more friends and the user has a registered account and a second group of the subset of the set of subscription services representing subscription services with which a minority of the one or more friends and the user has a registered account. The media guidance application may position the first group relative to the second group in the second of the regions. In this case, the media guidance application is focusing on the set of subscription services, rather than the subset. For example, the media guidance application may determine that the user has five friends listed in the user's friends table of the viewing history database. The media guidance application may determine that at least three of the friends (e.g., the majority) are subscribed to Netflix and Hulu, subscription services in the subset. Therefore, the media guidance application may identify Netflix and Hulu as the first group and the remaining subscription services in the subset as the second group. When generating the fourth of the regions for display, the media guidance application may place the first group above the second group.

In some embodiments, the media guidance application may retrieve the access credentials corresponding to the account of the friend. For example, the media guidance application may generate a request on the friend's local device, requesting permission for the user to access the media asset on the subscription service the friend possesses access credentials for. Following the overarching example, the media guidance application may specifically request access credentials for the friend's Netflix account in order for the user to watch "Jurassic Park." In response to the friend accepting to share access credentials, the media guidance application may automatically populate the first of the regions using the retrieved access credentials. As mentioned previously, the first of the regions includes an access credentials input component. Thus, in this case, the media guidance application automatically provides the access credentials to the input component. Once the user has access to the media asset, the media guidance application may also modify the way-to-watch component, based on the retrieved access credentials. For example, the media guidance application may receive access credentials to Netflix. Accordingly, the media guidance application may place Netflix above the other subscription services in the way-to-watch component.

In some embodiments, the media guidance application may set a limit for the user to access the given subscription service. For example, the user's friend may grant the user access to the given subscription service. Since the access credentials are not originally the user's, the media guidance application may set a time limit or access limit to the user's access of the given subscription service. Suppose that the user is given access to Netflix. The media guidance application may allow the user to only access one media asset or may grant access to the user for only 24 hours. The media guidance application may enable the user to access the given subscription service in accordance with the set limit, such that access to the user to the subscription service is prevented after the limit is reached.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
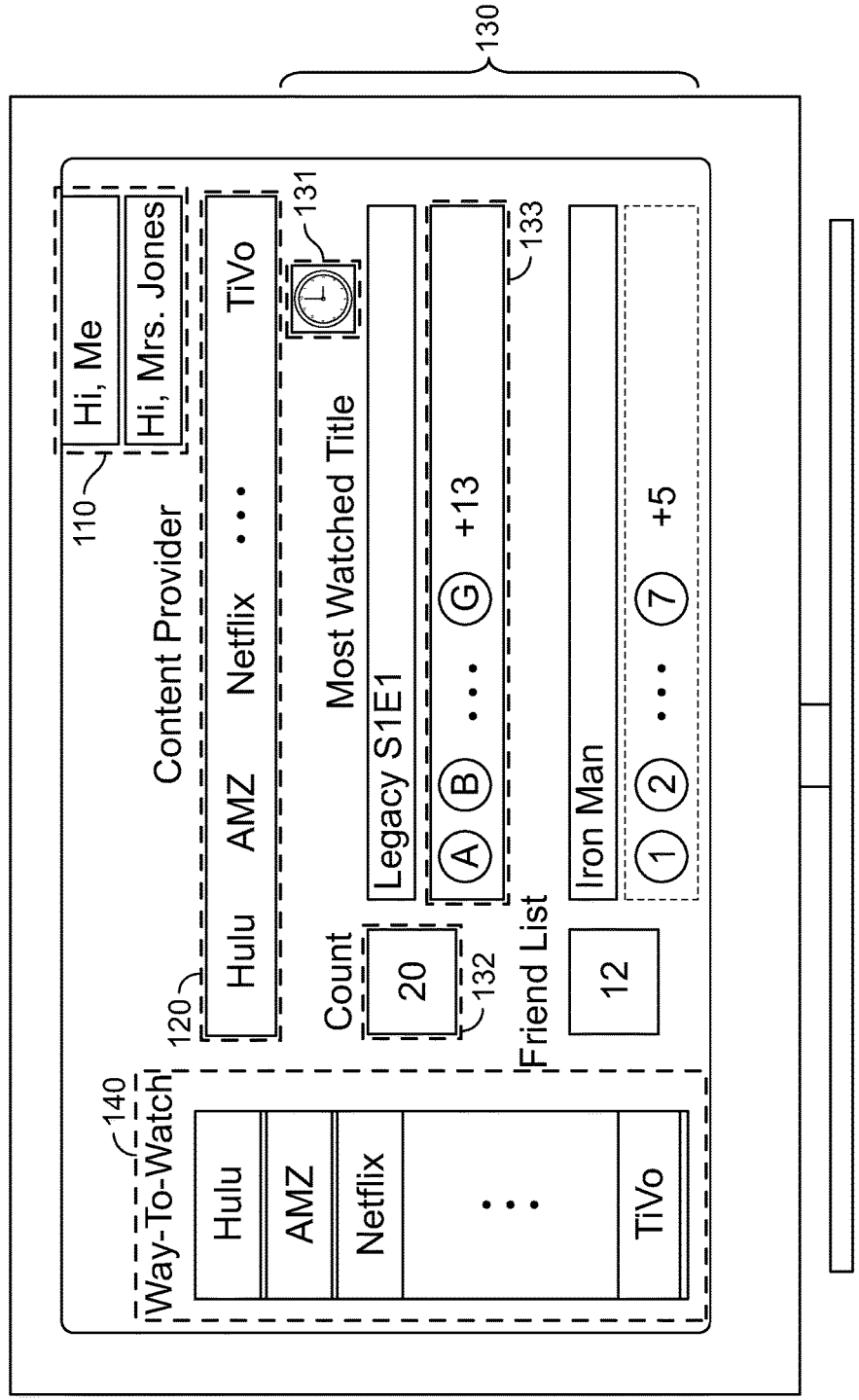
FIG. 1 is an illustrative example of a display screen that allows the user to access media assets through shared content service provider subscriptions, in accordance with some embodiments of the disclosure.

Systems and methods are described herein for sharing content service provider subscriptions for media asset recommendations. Consider a scenario in which a user is interested in watching the movie "Jurassic Park." However, the user may only have subscriptions to Amazon Prime Video and Hulu, two subscription services that do not have "Jurassic Park" in their respective video library. The media guidance application may determine that a friend from the user's social media has a subscription to Netflix. Furthermore, the media guidance application may determine that "Jurassic Park" is in the Netflix video library. In response, the media guidance application may request the user's friend for access credentials to Netflix, in order to allow the user to view "Jurassic Park." If the user's friend chooses to share access credentials, the user may thus be able to view "Jurassic Park" without separately purchasing a Netflix subscription.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some scenarios, the user may be unsure of the media assets that he/she may wish to view. Media assets may include movies, television shows, songs, games, etc. In this case, the user may desire a recommendation that is relevant to the user. The media guidance application may generate a display that can provide the user with information about the media assets that the user's friends have accessed. Thus, the user will be able to see the media assets that are most popular in the user's social network.

FIG. 1 is an illustrative example of a display screen that allows the user to access media assets through shared content service provider subscriptions, in accordance with some embodiments of the disclosure. The display serves to provide the user with information about media assets that are frequently accessed by the friends of the user and the subscription services that provide access to the media assets. The user may interact with the display using I/O Path 402 for the user input interface 410 on display 412 (discussed in FIG. 4 description).

Region 110 is an access credentials input component for receiving user input of one or more access credentials corresponding to one or more subscription services. For example, region 110 may allow the user to insert access credentials (e.g., username and password) to "login" and access an account associated with the user or a subscription service. The access credentials may be a username and a password combination. In some embodiments, the media guidance application may store the access credentials in a credentials database (e.g., in storage 408 (discussed in FIG. 4 description)) and may list the accounts accessible to the user in region 110. For example, region 110 may include a dropdown menu that lists several accounts associated with their respective access credentials. The user may select the accounts that he/she wishes to access. For example, the dropdown menu may list three accounts associated with the user, a second user and a third user. The second user may be someone in the user's household and the third user may be a friend of the user who lives away from the user. The media guidance application may receive user input (e.g., via I/O Path 402 (discussed in FIG. 4 description)) to select one of the accounts listed (e.g., the user's account). The media guidance application may then retrieve (e.g., via control circuitry 404 (discussed in FIG. 4 description)) the access credentials from the credentials database. It should be noted that multiple users can "login" through region 110. For example, the user and the second user may be accessing the media guidance application together. Both users may decide to enter their access credentials in the input component of region 110 and login to the media guidance application together on the same local device.

Region 120 includes a content provider component representing a set of subscription services currently being accessed by one or more friends of the user. For example, whenever a user enters the correct access credentials to the media guidance application, the media guidance application may note that the user has successfully accessed his/her account. The media guidance application may identify (e.g., via control circuitry 404 (discussed in FIG. 4 description)) the friends of the user by accessing a viewing history database on a remote server with information about the viewing history and the friends table of users using the media guidance application. More specifically, the viewing history database may contain information such as the names of media assets accessed by a user, time stamps of when the media asset was accessed, the subscription service streaming the media asset, along with the device used for access. Each user may have his/her own separate table within the viewing history database that lists this information respective to the user. Furthermore, the viewing history database may link users if the users are friends. For example, the viewing history database may feature a viewing history table of viewer A, the user. Suppose that viewer A is friends with viewer B and viewer C. The viewing history database may include a friends table associated with viewer A that lists viewer B and viewer C. Thus, the media guidance application may refer to the viewing history database, retrieve the friends table of viewer A and identify viewer B in the friends table. The friends table in the viewing history database may be generated using information about the user's social media interactions. For example, the media guidance application may determine the friends of the user through the user's friend list from a social network platform, e.g., Facebook.

It should be noted that the remote server can also be multiple servers. For example, the media guidance application may retrieve the viewing history table from one server, and retrieve the friends table from a second server. The server can be any device that provides a service, such as file retrieval, for a client, such as the user's local device. The server can be connected to the user's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely.

Upon identifying a friend of the user (e.g., the friend is listed in the friends table associated with the user), the media guidance application on the user's local device may communicate (e.g., via communications network 514 (discussed in FIG. 5 description)) with the media guidance application on the friend's local device through a communication server, to determine whether the friend is accessing the media guidance application (e.g., query whether the friend is "online"). In response to determining the friend is accessing the media guidance application on his/her local device, the media guidance application on the user's local device may request information about the subscription services the friend is currently accessing. This process may be repeated for each friend associated with the user. The media guidance application on the user's local device is thus able to list all the subscription services that the friends associated with the user are currently using.

Region 130 displays the most watched content accessible to the user, and lists popular media assets viewed by the user's friends, the friends that viewed the media assets, and the view count of each media asset. Time option 131 is a calendar that allows the user to organize the media assets listed in region 130 based on a threshold time period (e.g., viewing period). The threshold time period may be a window(s) of time (e.g., past day, past week, dates between Oct. 1, 2017 and Oct. 3, 2017, etc.) in which to identify viewing activity of the friends of the user. Suppose the user views the calendar by selecting time option 131 and selects specific days on the calendar (e.g., Oct. 1, 2017, Oct. 3, 2017, and Oct. 5, 2017). The media guidance application on the user's local device will generate media assets accessed on the dates selected by the user.

View count 132 represents the number of times a media asset has been viewed by the friends of the user. The media guidance application may determine (e.g., via control circuitry 404 (discussed in FIG. 4 description)) the view count by referring to the viewing history database. The media guidance application may sort the viewing history of a friend of the user based on time stamps listed in the viewing history database. Accordingly, the media guidance application can determine the viewing history specific to the dates selected by the user. The media guidance application may create (e.g., via control circuitry 404 (discussed in FIG. 4 description)) a tracking table (e.g., in storage 408 (discussed in FIG. 4 description)) to determine the media assets with the most views, the subscription services used to access the media assets, the friends that accessed the media assets, and the amount of the media asset watched. For example, the media guidance application may first populate the tracking table by listing the names of the media assets that were accessed by all the friends and the user in the threshold time period. Suppose that four shows/movies were accessed by twenty friends and the user, including: Game of Thrones, The Walking Dead, Legacy, and Iron Man. For television shows, suppose that the media assets are all solely the first episodes of the respective first seasons (e.g., Game of Thrones Season 1, Episode 1). The media guidance application may list the media assets in the first column of the tracking table. In order to populate media assets that the user has not seen exclusively, the media guidance application may remove the media assets that the user has viewed from the tracking table. The media guidance application may search the user's entire viewing history to determine whether any of the media assets listed in the tracking table are present. Suppose that Game of Thrones Season 1 Episode 1 is listed in the viewing history of the user. In response, the media guidance application may remove Game of Thrones Season 1 Episode 1 from the tracking table.

The media guidance application may then determine (e.g., via control circuitry 404 (discussed in FIG. 4 description)) the number of views each media asset received by incrementing the view count associated with the media asset in a second column, whenever the media asset appears in the viewing histories of the friends at the dates selected by the user. Suppose that Legacy Season 1 Episode 1 (henceforth Legacy S1E1) received 20 views, and Iron Man received 12 views. The Walking Dead Season 1 Episode 1 may have received 5 views. The media guidance application may also list the names of the friends that viewed the media assets in a third column of the tracking table, respective to each media asset. The fourth column may provide the names of the subscription services that were used by the friends to view the media assets, respectively. Lastly, the media guidance application may place the amount of the media asset that was accessed by each friend. For example, a user may have watched a movie entirely or may have stopped at any arbitrary position (e.g., halfway). If a user stopped exactly halfway, the media guidance application may store 50% in the fifth column, respective to a friend and the media asset.

Using the information in the tracking table, the media guidance application may populate region 130 (e.g., via control circuitry 404 (discussed in FIG. 4 description)). The list of media assets may be organized based on view count, alphabetically, or based on user preferences from the user profile. As seen in FIG. 1, the media assets are listed in terms of view count (e.g., media assets with a higher view count are listed first). As determined by the media guidance application, Legacy S1E1 had the most view counts during the threshold time period, and is listed first, alongside the view count 132, which is 20. The friends that watched Legacy S1E1 are listed with identifiers (e.g., display pictures, avatars, usernames, etc.) in friend list 133.

The media guidance application may also organize region 130 based on user preferences (e.g., via control circuitry 404 (discussed in FIG. 4 description)). For example, the media guidance application may retrieve the user profile associated with the user from storage 408 (e.g., discussed in FIG. 4 description). The user profile may indicate a user's preferred genres, cast members/artists, topics, movie lengths, etc. Accordingly, the media guidance application determine that the user prefers the action genre and media assets featuring a particular actor. When generating the tracking table, the media guidance application may also retrieve the metadata associated with the media asset from the media guidance data source 518 (e.g., discussed in FIG. 5 description). For example, the media guidance application may retrieve metadata offered by Netflix. Alternatively, the media guidance application may retrieve the metadata from the Internet (e.g., IMDB, Metacritic). The metadata may list information about the media asset such as name, genre, year produced, featured cast/artist, and a brief description. Suppose that the media guidance application determines that the user likes to watch movies featuring Robert Downey Jr. Upon determining that the metadata of Iron Man lists Robert Downey Jr. as a cast member, the media guidance application may place Iron Man above Legacy S1E1 in FIG. 1.

In some embodiments, view count 132 may also take into consideration whether the media asset was completely accessed. For example, if a friend accessed a media asset and stopped watching after ten minutes, and another friend watched the entire two hours of a movie, the media guidance application may not count each with one full view. Instead, the media guidance application may retrieve the amount of access from the tracking table and count (e.g., via control circuitry 404 (discussed in FIG. 4 description)) the former's view as 0.08 (e.g., because the former only watched approximately 8% of the movie) and count the latter's view as 1 (e.g., because the latter completed the entire movie). Thus, the view count of the movie would be a total of 1.08.

In some embodiments, view count 132 may also weigh the views based on a correlation between the user's preferences and a friend's preferences (e.g., via control circuitry 404 (discussed in FIG. 4 description)). The media guidance application may retrieve the viewing history of the user and the friend from the viewing history database and use data analytics (e.g., clustering, recommendation, classification) to determine whether the users have similar viewing preferences (e.g., genre, actors, length of movies, etc.). For example, the media guidance application may determine a quantitative correlation between 0 and 1 that is stored in a weights column in the friends table. Suppose that a complete match is found, the correlation may be 1. If two users have opposite preferences, the correlation may be 0. Suppose that the media guidance application determines correlation values for all friends of the user and updates the friends table accordingly. If a first friend is associated with a correlation of 0.45, the media guidance application may multiply the friend's view count by 0.45. Therefore, the total count presented in view count 132 will take the correlation between the user and each friend into account.

Region 140 includes a way-to-watch component representing a subset of the set of subscription services from which the media asset is accessible. Suppose the user wishes to select one of the media assets listed in the region 130. The media guidance application may receive user input selecting one of the media assets (e.g., Legacy S1E1). In response, the media guidance application may list a set of subscription services that include the media asset in their database (e.g., library of content). For example, the media guidance application may list Hulu, Amazon Prime Video, Netflix, TiVo, etc. as subscription services which include Legacy S1E1 in their respective video databases.

In some embodiments, the media guidance application may generate a first group of the subset of the set of subscription services representing subscription services with which a majority of the one or more friends has a registered account and a second group of the subset of the set of subscription services representing subscription services with which a minority of the one or more friends has a registered account. The media guidance application may position the first group relative to the second group in region 140. For example, the media guidance application may determine that the user has thirty friends listed in the user's friends table of the viewing history database. The media guidance application may determine that the at least twenty of the friends (e.g., the majority) accessed the media asset (e.g., Legacy S1E1) using Netflix and Hulu, subscription services in the subset. Therefore, the media guidance application may identify Netflix and Hulu as the first group and the remaining subscription services in the subset as the second group (e.g., because the remaining friends represent the minority). When generating region 140 for display, the media guidance application may place the first group above the second group.

Furthermore the media guidance application may organize region 140 based on the subscription services that the user prefers or uses often. For example, the media guidance application may determine from the viewing history database, that the user primarily accesses content on Netflix. Therefore, region 140 may feature Netflix first, followed by the subscription service that the user accessed second-most. The user may also manually set a preferred subscription service. For example, the user may indicate that he/she wishes to ideally access Netflix if the media asset is available in an subset of subscription services that includes Netflix.

As mentioned previously, two or more friends can provide access credentials to login to the media guidance application on the same local device. In this case, the media guidance application would generate region 130 based on a combination of friends, preferences and viewing history, of the users. The users may also adjust logic settings of the media guidance application. The logic settings may be adjustable OR, AND, ONLY values for different criteria. For example, the logic setting for which friends to consider when generating the tracking table may indicate "friends of first user AND second user." In this case, the media guidance application may retrieve the viewing histories of all shared/mutual friends of the two users to determine view counts and subscription services. Alternatively, the logic setting "friends of first user OR second user" allows the media guidance application to consider all friends associated with the two users to determine view counts and subscription services. The logic setting "friends of first user ONLY" allows the media guidance application to consider only the friends of the first user to determine view counts and subscription services.

The logic settings may also be adjustable for the media assets viewed. For example, when presenting the most watched media assets in region 130, the media guidance application may generate the tracking table. In particular, if the logic setting states "ignore media assets viewed by first user AND second user," the media guidance application will remove media assets that both users have already viewed. If the logic setting states "ignore media assets viewed by first user OR second user," the media guidance application will remove any media asset from the tracking table if at least one of the users has viewed the media asset. If the logic setting states "ignore media assets viewed by first user ONLY," the media guidance application will remove the media assets that the first user has already viewed.

Region 140 may also be organized based on logic settings for subscription services. Suppose that the logic setting states "rank by preferred subscription services of first user AND second user." In this case, the media guidance application may refer to the viewing history database of both users and count the number of times each subscription service is used to access a media asset. For example, the media guidance application may determine (e.g., via control circuitry 404 (discussed in FIG. 4 description)) that during the threshold time period, Netflix was used by 10 times by the first user and 13 times by the second user. In addition, Hulu was used 5 times by the first user and 15 times by the second user. Thus, Netflix was used 23 times and Hulu was used 20 times. In response, the media guidance application may list Netflix above Hulu in region 140. If the logic setting states "rank by preferred subscription services of first user OR second user," the media guidance application may simply determine which subscription service was used the most by either user. In this example, the media guidance application may list Hulu above Netflix in region 140 because Hulu was used the most amongst any user (e.g., 15 times by second user).

Figure 2:
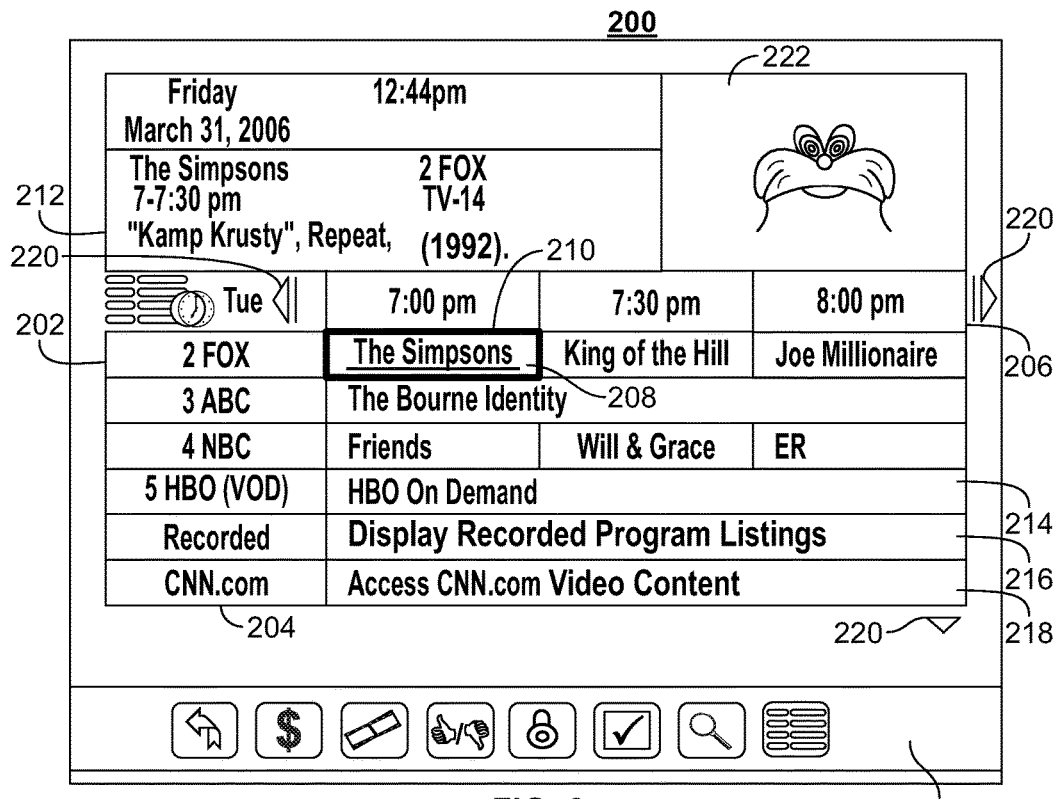
FIGS. 2 and 3 show illustrative examples of display screens generated by a media guidance application in accordance with some embodiments of the disclosure.
Figure 3:
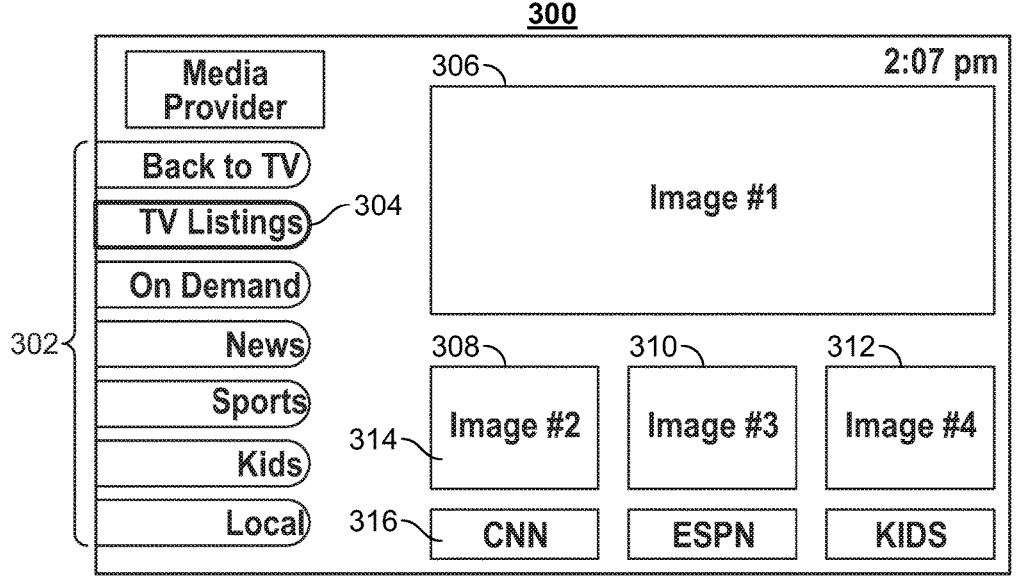

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
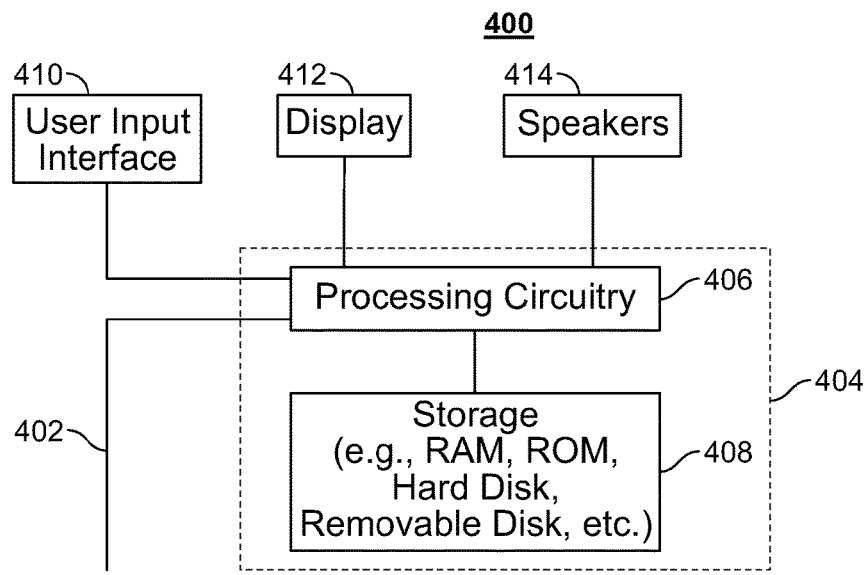
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
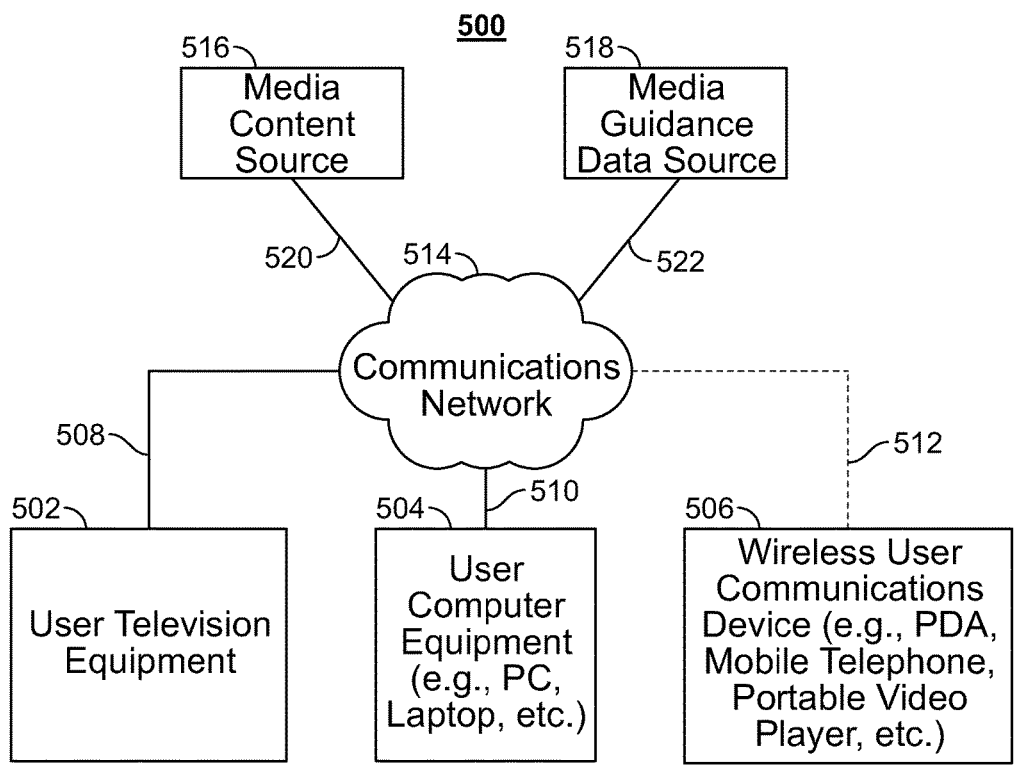
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
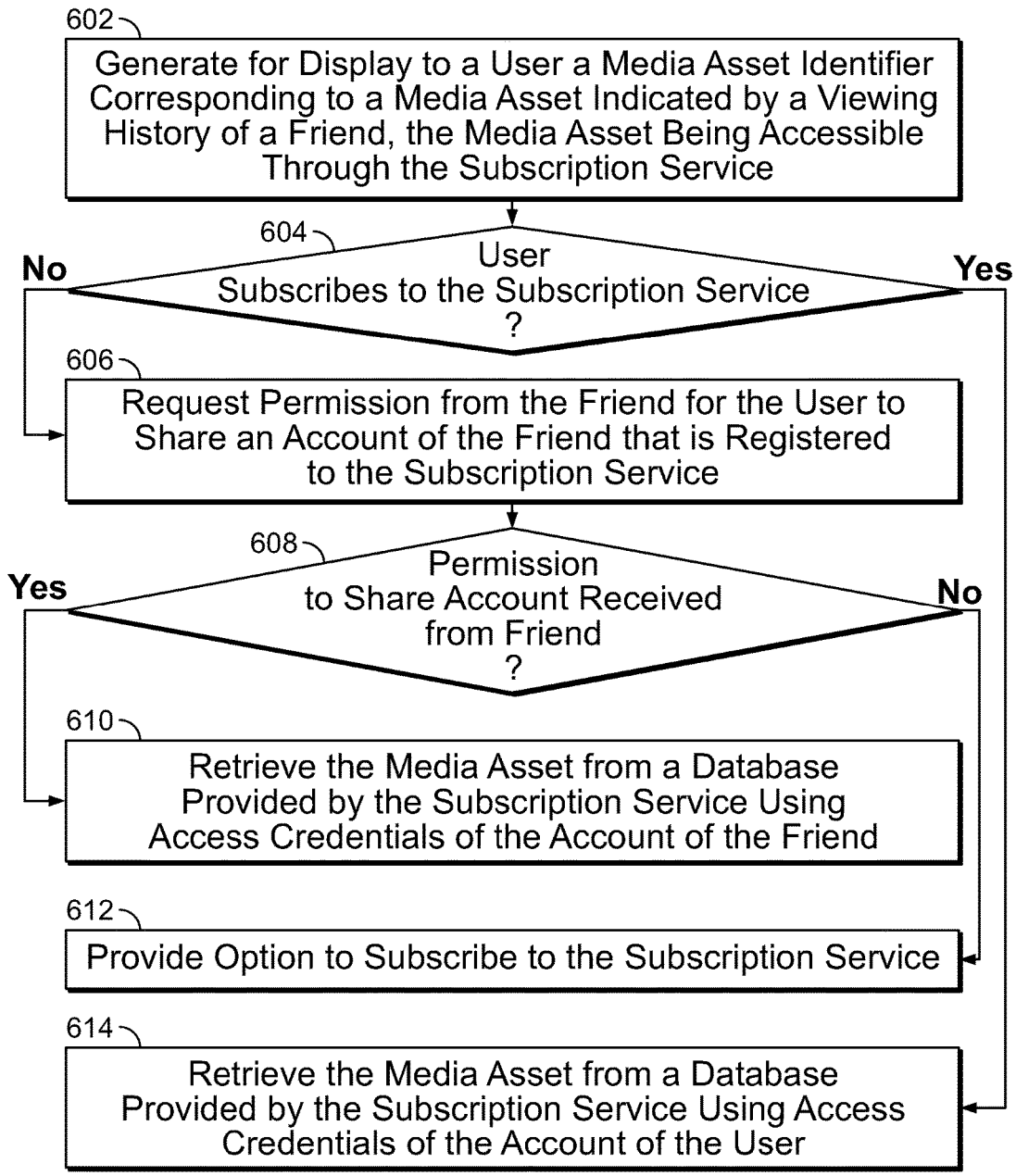
FIG. 6 is a flowchart of an illustrative process for accessing a recommended media asset on a subscription service using retrieved access credentials, in accordance with some embodiments of the disclosure.

FIG. 6 is a flowchart of illustrative steps of a process 600 for accessing a recommended media asset on a subscription service using retrieved access credentials, in accordance with some embodiments of the disclosure. It should be noted that process 600 or any step thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5)) in order to access a recommended media asset on a subscription service using retrieved access credentials. In addition, one or more steps of process 600 may be incorporated into or combined with one or more steps of any other process or embodiment (e.g., as described in relation to FIGS. 1 and 7-13).

At step 602, control circuitry 404 (FIG. 4) generates for display to a user a media asset identifier corresponding to a media asset indicated by a viewing history of a friend, the media asset being accessible through the subscription service. For example, control circuitry 404 (FIG. 4) may identify a friend of a user from the user's social media data (e.g., accessible from wireless communications device 506 (FIG. 5)). Control circuitry 404 may retrieve the friend's viewing history from a viewing history database on a server that is part of the communications network 514 (FIG. 5), and determine a media asset (e.g., movie, game, song) that is present in the viewing history. As mentioned previously, the viewing history database may contain information such as the names of media assets accessed by a user, time stamps of when the media asset was accessed, the subscription service streaming the media asset, along with the device used for access. Each user may have his/her own separate table within the viewing history database that lists this information respective to the user. Furthermore, the viewing history database may link users if the users are friends. For example, the viewing history database may feature a viewing history table of viewer A, the user. Suppose that viewer A is friends with viewer B and viewer C. The viewing history database may include a friends table associated with viewer A that lists viewer B and viewer C. Thus, the control circuitry 404 (FIG. 4) may refer to the viewing history database, retrieve the friends table of viewer A, identify viewer B in the friends table, and retrieve the viewing history table of viewer B. Control circuitry 404 may display media asset identifiers on display 412 (FIG. 4) representing the media assets in the friend's viewing history. Suppose that the friend has viewed the movies "Iron Man," "Jurassic Park," "Jaws," and "Mission Impossible." Control circuitry 404 may display media asset identifiers in the form of movie posters. The user may select to view "Jurassic Park."

At step 604, control circuitry 404 (FIG. 4) determines whether the user subscribes to the subscription service associated with the media asset. Each media asset may be accessible from a specific subset of subscription services. For example, "Jurassic Park" may be accessible for viewing on Netflix and Epic, two subscription services. Control circuitry 404 may refer to the user profile to retrieve a credentials database that stores all access credentials the user possesses to access various subscription services. Control circuitry 404 may then determine that the user does or does not have a Netflix or an Epic subscription. If the user already has a subscription with Netflix or Epic, the process skips to step 614, where control circuitry 404 retrieves the media asset from a database provided by the subscription service using access credentials of the account of the user. For example, control circuitry 404 may simply retrieve "Jurassic Park" from the Netflix movie database for playback at the user's device (e.g., user television equipment 502, user computer equipment 504, and wireless user communications device 506 (FIG. 5)).

In response to determining that the user does not subscribe to the subscription service (e.g., Netflix or Epic), at step 606, control circuitry 404 (FIG. 4) requests permission from the friend for the user to share an account of the friend that is registered to the subscription service. Control circuitry 404 may first generate for display to the user, a selectable option to query the friend for access to the given subscription service. For example, control circuitry 404 may determine that "Jurassic Park" is accessible on Netflix. Control circuitry 404 may inform the user that viewer B has a subscription to Netflix and generate a selectable option on display 412 (FIG. 4) of the user's local device to query whether the user wants to request permission, from viewer B, to share the subscription to Netflix. If the user chooses to request credentials, control circuitry 404 on the user's device may communicate with control circuitry 404 on the friend's device over communications network 514 (FIG. 5). Control circuitry 404 on the user's device may generate a request, on display 412, to allow the user access to the friend's Netflix account.

At step 608, control circuitry 404 (FIG. 4) determines whether the friend's permission to share the subscription service account was received. For example, control circuitry 404 on the user's device may wait for the control circuitry 404 on the friend's device to respond to the request. Control circuitry 404 on the friend's device may send a message to control circuitry 404 on the user's device with the decision of the friend. In a situation where the friend does not respond, control circuitry 404 on the user's device may automatically determine not to share the access credentials.

Suppose that the friend accepts the request. The message sent by control circuitry 404 of the friend's device may include access credentials to access the friend's Netflix account. In response to receiving the permission from the friend, at step 610, control circuitry 404 (FIG. 4) retrieves the media asset from a database provided by the subscription service, using access credentials of the account of the friend. The access credentials may be transferred from the friend's device to the user's device in the form of a token over communication network 514 (FIG. 5). The token may include the username and password used to access the friend's account on the subscription service. Control circuitry 404 on the friend's device may encrypt the token and send a key to control circuitry 404 on the user's device, to decrypt the token once the token is received by the user's device. In some embodiments, the token may include a temporary username and password for access to a guest (e.g., temporary) account on the friend's subscription service. For example, control circuitry 404 may retrieve "Jurassic Park" from the Netflix movie database (e.g., media content source 516 (FIG. 5)), using the friend's access credentials.

If the friend of the user declines sharing access credentials, the process shifts to step 612, where control circuitry 404 (FIG. 4) provides the user with an option on display 412 to subscribe to the subscription service. For example, control circuitry 404 may generate a prompt that allows the user to create a Netflix or Epic account.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 6.

Figure 7:
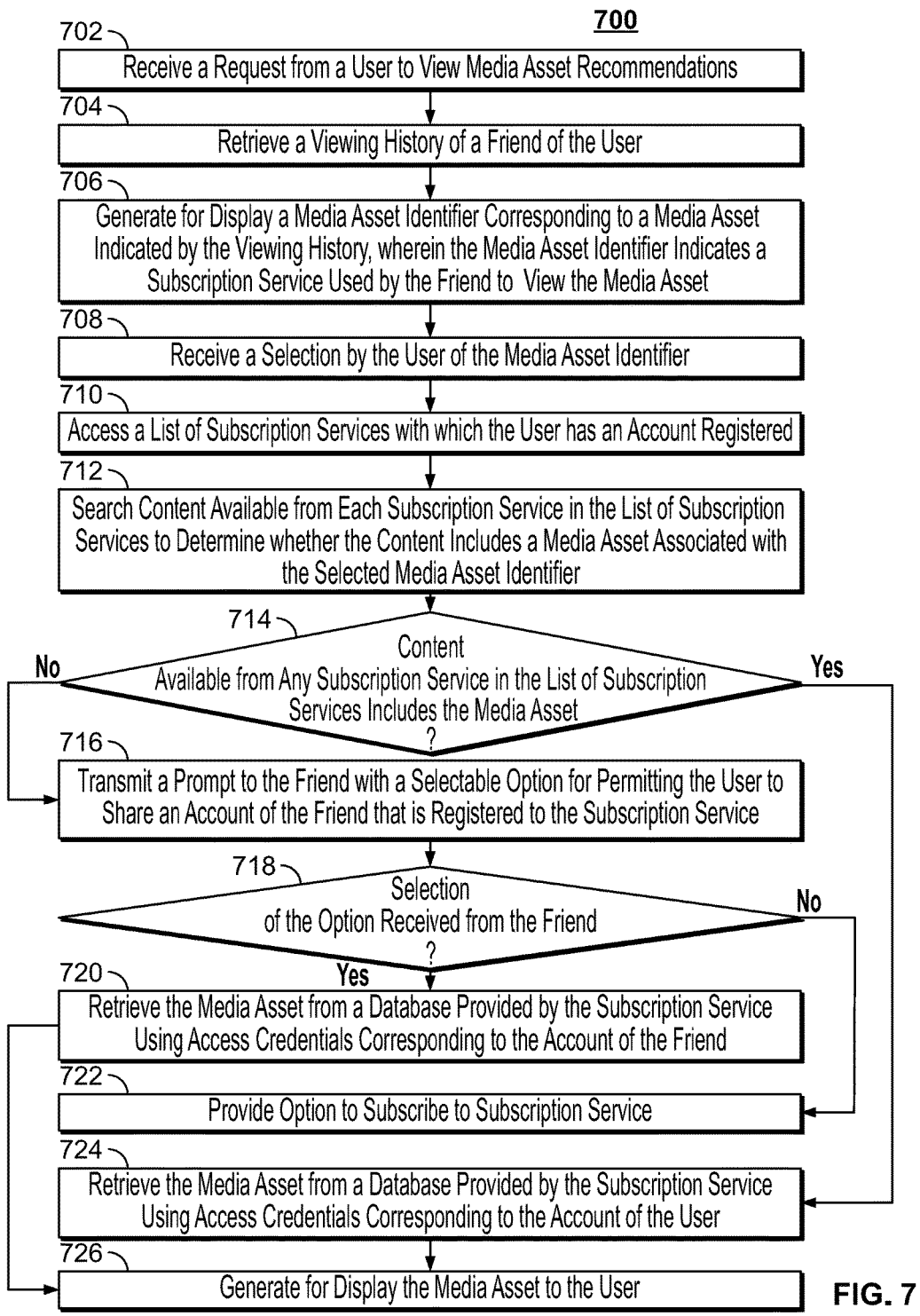
FIG. 7 is a flowchart of a detailed illustrative process for accessing a recommended media asset on a subscription service using retrieved access credentials, in accordance with some embodiments of the disclosure

FIG. 7 is a flowchart of illustrative steps of a process 700 for accessing a recommended media asset on a subscription service using retrieved access credentials, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to access a recommended media asset on a subscription service using retrieved access credentials. In addition, one or more steps of process 700 may be incorporated into or combined with one or more steps of any other process or embodiment (e.g., as described in relation to FIGS. 1, 6 and 8-13).

At step 702, control circuitry 404 (FIG. 4) receives a request from a user to view media asset recommendations. For example, the user may desire to view a media asset (e.g., a movie or song) and may request recommendations. Control circuitry 404 may initiate the process of providing recommendations based on the viewing history of friends of the user.

At step 704, in response to receiving the request, control circuitry 404 (FIG. 4) retrieves the viewing history of a friend of the user (e.g., to recommend a media asset accessed by the user's friend). For example, control circuitry 404 may refer to a viewing history database on a server. The viewing history database may contain information such as the names of media assets accessed by a user, time stamps of when the media asset was accessed, the subscription service streaming the media asset, along with the device used for access. Each user may have his/her own separate table within the viewing history database that lists this information respective to the user. Furthermore, the viewing history database may link users if the users are friends. For example, the viewing history database may feature a viewing history table of viewer A, the user. Suppose that viewer A is friends with viewer B and viewer C. The viewing history database may include a friends table associated with viewer A that lists viewer B and viewer C. Thus, the media guidance application may refer to the viewing history database, retrieve the friends table of viewer A, identify viewer B in the friends table, and retrieve the viewing history table of viewer B. The media guidance application may generate the friends table based on the social media interactions of the user. The user may also manually identify friends that he/she is associated with. It should be noted that the viewing history table and friends table of each user may remain private to the respective user if the user does not wish to share that information.

At step 706, control circuitry 404 (FIG. 4) generates, for display, a media asset identifier corresponding to a media asset indicated by the viewing history, wherein the media asset identifier indicates a subscription service used by the friend to view the media asset. Suppose that the user desires to view the movie "Jurassic Park." Control circuitry 404 may refer to the viewing history database and retrieve the user's friends table. The friends table may list viewer B and viewer C as friends. Control circuitry 404 may identify viewer B and retrieve his viewing history table. Suppose that the viewing history table of viewer B includes "Jurassic Park," and further indicates that the media asset was accessed by viewer B through the subscription service, Netflix. Control circuitry 404 may generate for display on a user's local device, a media asset identifier, such as the Netflix logo, that indicates the subscription service used by viewer B, to view "Jurassic Park."

At step 708, control circuitry 404 (FIG. 4) receives (e.g., via I/O Path 402 (FIG. 4)) a selection by the user of the media asset identifier. For example, the user may select the media asset identifier (e.g., click on the Netflix logo) to indicate a desire to watch "Jurassic Park."

At step 710, control circuitry 404 (FIG. 4) accesses a list of subscription services with which the user has an account registered. Control circuitry 404 may refer to a user profile (e.g., in storage 408 (FIG. 4)) to retrieve the subscription services that the user has subscribed to. The user profile may include a credentials database with access credentials to the subscription services that the user is subscribed to. For example, the user profile may indicate that the user only has accounts registered with Amazon Prime Video and Hulu. Therefore, the user does not have an account registered with Netflix.

At step 712, control circuitry 404 (FIG. 4) searches content available from each subscription service in the list of subscription services to determine whether the content includes the media asset associated with the selected media asset identifier. For example, control circuitry 404 may retrieve library information about each subscription service in the list of subscription services from the media guidance data source 518 (FIG. 5). The library information may include a list of all media assets that are accessible to users that possess registered accounts with the subscription service. For example, control circuitry 404 may retrieve a list of media assets accessible on Amazon Prime Video.

At step 714, control circuitry 404 (FIG. 4) determines whether the content available from any subscription service in the list of subscription services includes the media asset. For example, control circuitry 404 may search for "Jurassic Park" in the list of media assets accessible on Amazon Prime Video and Hulu. If control circuitry 404 finds the media asset in Amazon Prime Video or Hulu, subscription services that the user has access credentials for, control circuitry 404 (FIG. 4) retrieves the media asset from a database provided by the subscription service, using access credentials of the account of the user at step 724. For example, control circuitry 404 may retrieve "Jurassic Park" from the Amazon Prime Video movie database (e.g., media content source 516 (FIG. 5)), using the user's access credentials.

At step 716, in response to determining that the content available from each subscription service in the list of subscription services does not include the media asset, control circuitry 404 (FIG. 4) transmits a prompt to the friend with a selectable option for permitting the user to share an account of the friend that is registered to the subscription service. For example, control circuitry 404 may conclude that the user cannot access the media asset on his/her subscription services. Control circuitry 404 may prompt viewer B, on a local device accessed by viewer B, requesting permission to share the account of viewer B that is registered with the subscription service used to access the media asset. For example, control circuitry 404 on the user's device may communicate with control circuitry 404 on the friend's device over communications network 514 (FIG. 5). Control circuitry 404 on the user's device may generate a request, on display 412, to allow the user access to the friend's Netflix account.

At step 718, control circuitry 404 (FIG. 4) determines whether the friend's permission to share the subscription service account was received. For example, control circuitry 404 on the user's device may wait for the control circuitry 404 on the friend's device to respond to the request. Control circuitry 404 on the friend's device may send a message to control circuitry 404 on the user's device with the decision of the friend. In a situation where the friend does not respond, control circuitry 404 on the user's device may automatically determine not to share the access credentials. In some embodiments, multiple friends of the user may subscribe to a subscription service that provides access to a media asset. Therefore, control circuitry 404 may request all friends for permission. However, control circuitry 404 may only utilize the access credentials of the friend with the quickest response.

Suppose that the friend accepts the request. The message sent by control circuitry 404 of the friend's device may include access credentials to access the friend's Netflix account. In response to receiving the permission from the friend, at step 720, control circuitry 404 (FIG. 4) retrieves the media asset from a database provided by the subscription service, using access credentials of the account of the friend. For example, control circuitry 404 may retrieve "Jurassic Park" from the Netflix movie database (e.g., media content source 516 (FIG. 5)), using the friend's access credentials.

In some embodiments, control circuitry 404 (FIG. 4) may determine that the friend of the user does not subscribe to any of the subscription services that provide access to the media asset. However, control circuitry 404 may determine that the viewing history database indicates that the friend viewed the media asset on broadcast television. For example, the friend may have seen "Jurassic Park" when it was transmitted on the FOX, a television channel. Control circuitry 404 on the user's device may query control circuitry 404 on the friend's device to determine if the friend captured the media asset on through a digital video recorder (e.g., TiVo). Control circuitry 404 on the friend's device may search through the saved media assets in the friend's device in storage 408 for the media asset requested by the user. Upon finding the media asset, control circuitry 404 on the friend's device may generate a prompt on display 412 of the friend's device, requesting permission to send the stored media asset to the user. If the friend accepts the request (e.g., via I/O Path 402 (FIG. 4)), control circuitry 404 on the friend's device may send the media asset to the user's device over communications network 514 (FIG. 5).

If the friend of the user declines sharing access credentials, the process shifts to step 722, where control circuitry 404 (FIG. 4) provides the user with an option on display 412 to subscribe to the subscription service. For example, control circuitry 404 may generate a prompt that allows the user to create a Netflix account. In some embodiments, control circuitry 404 may allow the user to download a copy of the media asset from an alternate media content source. For example, control circuitry 404 may determine that Amazon Prime Video does not have the media asset in its subscription library, but its counterpart, Amazon Video, allows the user to rent the media asset or purchase the media asset. In response, control circuitry 404 may provide the user with an option to buy or rent the media asset.

At step 726, control circuitry 404 (FIG. 4) generates for display the media asset to the user. For example, control circuitry 404 may display "Jurassic Park" to the user on display 412 of the user's local device (e.g., television equipment 502, computer equipment 504, wireless communications device 506 (FIG. 5)).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 7.

Figure 8:
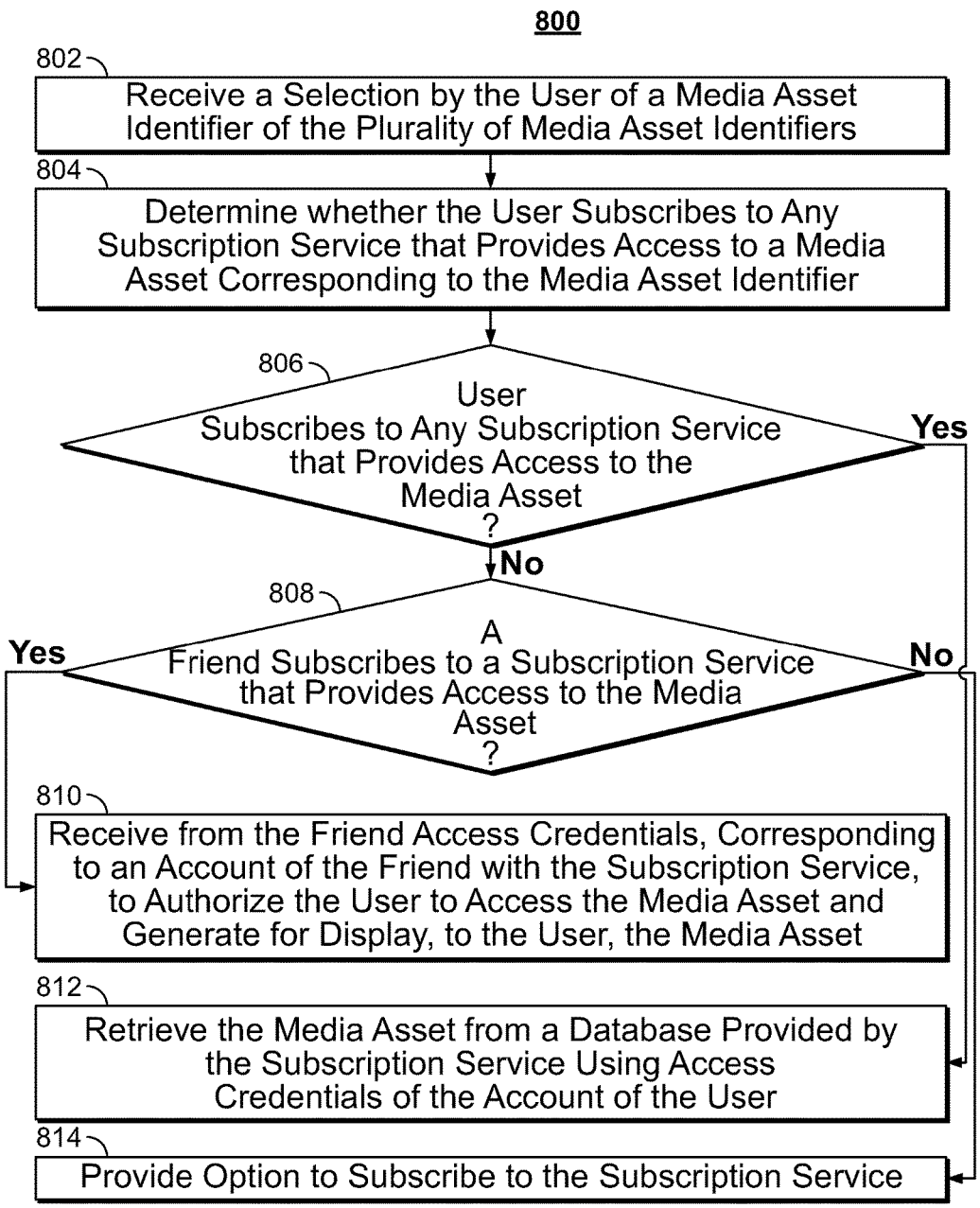
FIG. 8 is a flowchart of an illustrative process for accessing a media asset on a subscription service using retrieved access credentials, in accordance with some embodiments of the disclosure.

FIG. 8 is a flowchart of illustrative steps of a process 800 for accessing a media asset on a subscription service using retrieved access credentials, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to access a media asset on a subscription service using retrieved access credentials. In addition, one or more steps of process 800 may be incorporated into or combined with one or more steps of any other process or embodiment (e.g., as described in relation to FIGS. 1, 6-7 and 9-13).

At step 802, control circuitry 404 (FIG. 4) receives a selection by the user of a media asset identifier of the plurality of media asset identifiers. The user may be presented with a user input interface 410 on display 412 generated by control circuitry 404. The user input interface may include several media asset identifiers. In this case, the media asset identifier may be a poster of movie, album art of a song, or cover of a game. The media asset identifier may also simply be the name of the media asset. The user may select one of the media asset identifiers from the plurality of media asset identifiers and control circuitry 404 may receive the selection via I/O Path 402. Suppose that the user chooses to view "Jurassic Park" and selects a "Jurassic Park" movie poster, which is the media asset identifier.

At step 804, control circuitry 404 (FIG. 4) determines whether the user subscribes to any subscription service that provides access to a media asset corresponding to the media asset identifier. Control circuitry 404 may identify the user's subscription services that provide access to the media asset, by referring to the user profile (e.g., in storage 408 (FIG. 4)) to retrieve information about the user's subscriptions. In particular, control circuitry 404 may determine, from a credentials database in the user profile, the access credentials that the user possesses. For example, control circuitry 404 may identify Amazon Prime Video and Hulu as subscription services that are listed in the user's credentials database. Furthermore, control circuitry 404 may search for the media asset "Jurassic Park" in the media library of the subscription services. For example, control circuitry 404 may retrieve the list of media assets featured in Amazon Prime Video's media library from the media guidance data source 518 (FIG. 5). Control circuitry 404 may also search the media library of Hulu. Alternatively, control circuitry 404 may also determine all the subscription services that feature the media asset from the media guidance data source 518, or the Internet.

At step 806, control circuitry 404 (FIG. 4) determines whether the user subscribes to any subscription service that provides access to the media asset. Suppose that control circuitry 404 determines that "Jurassic Park" is not available in Amazon Prime Video or Hulu based on the search results from step 804. Control circuitry 404 may determine that the user does not subscribe to a subscription service that provides access to "Jurassic Park." Similarly, in the alternative method, if control circuitry 404 determines that the subscription services that provide access to "Jurassic Park" are Netflix and HBO Now, control circuitry 404 may conclude that the user does not have access credentials to Netflix and HBO Now. Therefore, the user does not have access to the media asset.

If control circuitry 404 finds the media asset in Amazon Prime Video or Hulu, subscription services that the user has access credentials for, control circuitry 404 (FIG. 4) retrieves the media asset from a database provided by the subscription service, using access credentials of the account of the user at step 812. For example, control circuitry 404 may retrieve "Jurassic Park" from the Amazon Prime Video movie database (e.g., media content source 516 (FIG. 5)), using the user's access credentials.

In response to determining that the user cannot access the media asset on a subscription service that the user is subscribed to, control circuitry 404 (FIG. 4) determines whether a friend subscribes to a subscription service that provides access to the media asset. For example, control circuitry 404 may refer to the viewing history database on a remote server to retrieve information about the friends of the user. The viewing history database may include a friends table that lists the user's friends. Control circuitry 404 may then retrieve the subscription services the friends are subscribed to. Suppose that control circuitry 404 identifies two friends in the user's friends table that have access to Netflix, a subscription service that provides access to "Jurassic Park."

In response to determining that a friend has access to a subscription service that provides access to the media asset, control circuitry 404 receives from the friend access credentials, corresponding to an account of the friend with the subscription service, to authorize the user to access the media asset and generates for display, to the user, the media asset. For example, control circuitry 404 on the user's device may communicate with control circuitry 404 on the friend's device over communications network 514 (FIG. 5). Control circuitry 404 on the user's device may generate a request, on display 412, to allow the user access to the friend's Netflix account. In some embodiments, multiple friends of the user may subscribe to a subscription service that provides access to a media asset. Therefore, control circuitry 404 may request all friends for permission. However, control circuitry 404 may only utilize the access credentials of the friend with the quickest response.

Suppose that the friend accepts the request. The message sent by control circuitry 404 of the friend's device may include access credentials to access the friend's Netflix account. In response to receiving the permission from the friend, control circuitry 404 (FIG. 4) retrieves the media asset from a database provided by the subscription service, using access credentials of the account of the friend. For example, control circuitry 404 may retrieve "Jurassic Park"

from the Netflix movie database (e.g., media content source 516 (FIG. 5)), using the friend's access credentials.

If no friends of the user subscribe to the subscription service that provides access to the media asset, the process shifts to step 814, where control circuitry 404 (FIG. 4) provides the user with an option on display 412 (FIG. 4) to subscribe to the subscription service. For example, control circuitry 404 may generate a prompt that allows the user to create a Netflix or HBO Now account.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 8.

Figure 9:
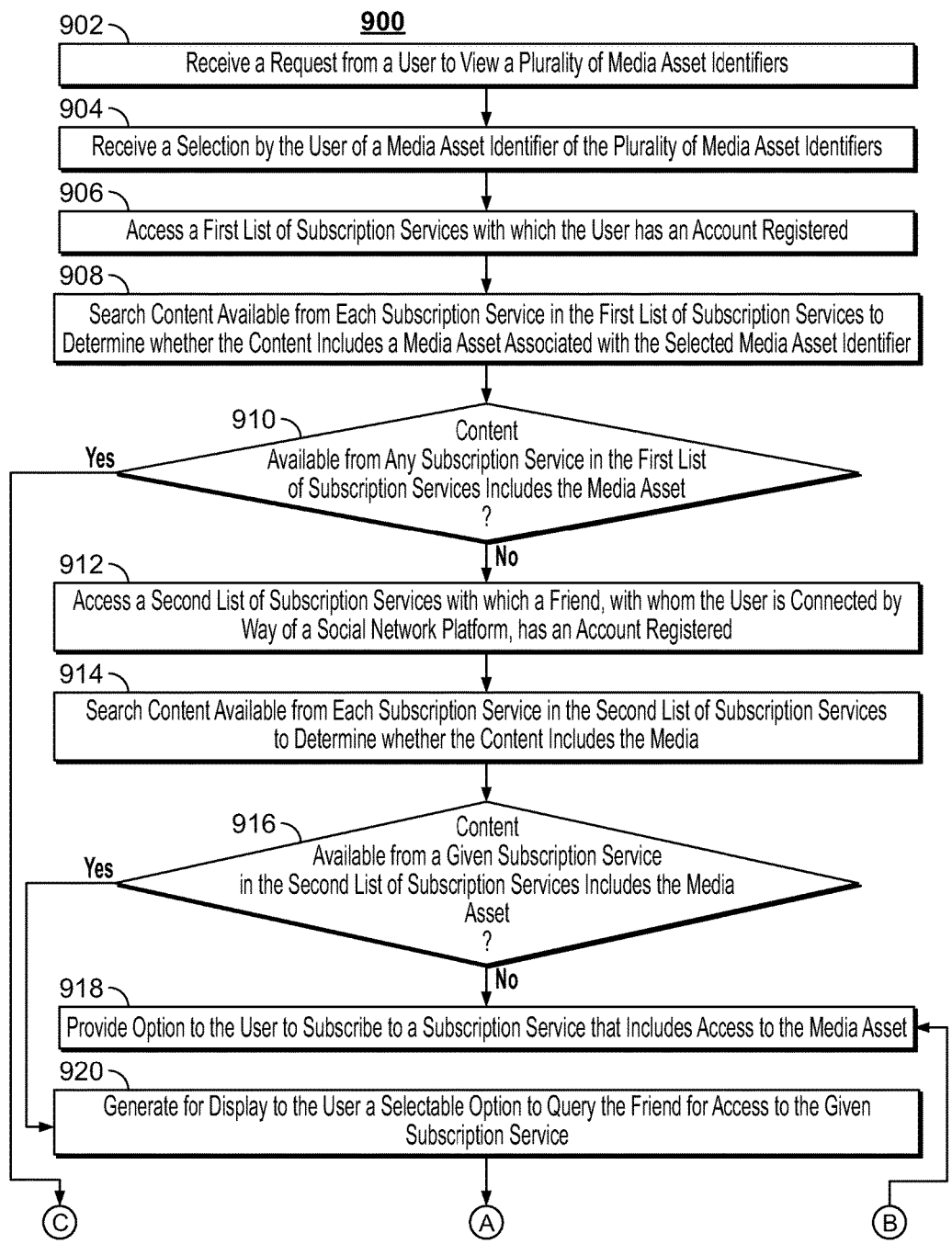
FIG. 9 is a flowchart of a detailed illustrative process for accessing a media asset on a subscription service using retrieved access credentials, in accordance with some embodiments of the disclosure.
Figure 9:
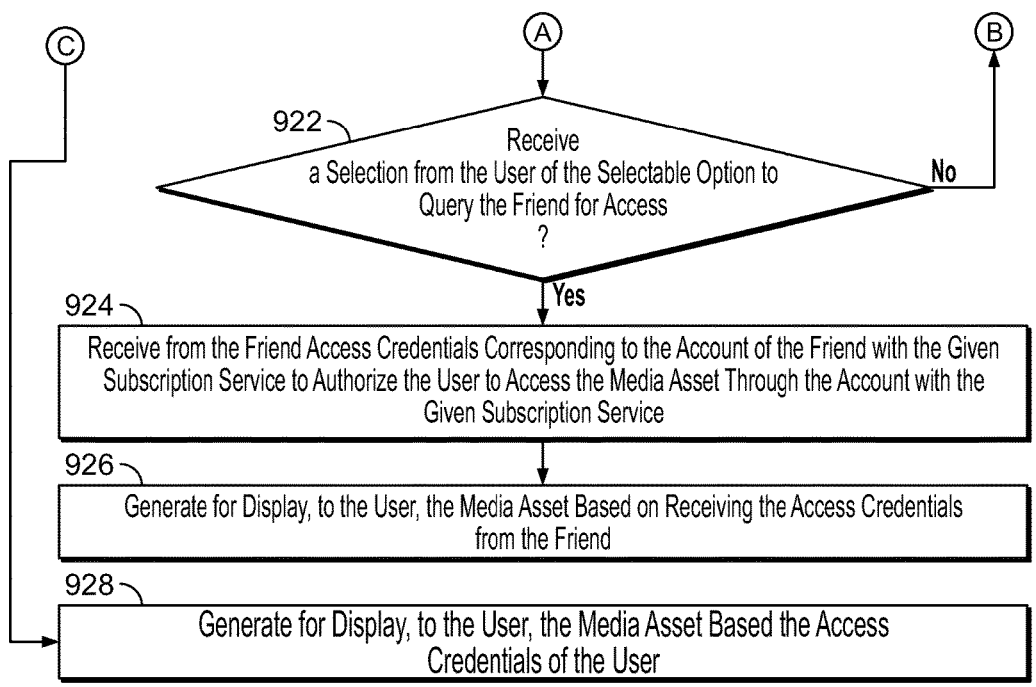

FIG. 9 is a flowchart of illustrative steps of a process 900 for accessing a media asset on a subscription service using retrieved access credentials, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to access a media asset on a subscription service using retrieved access credentials. In addition, one or more steps of process 900 may be incorporated into or combined with one or more steps of any other process or embodiment (e.g., as described in relation to FIGS. 1, 6-8 and 10-13).

At step 902, control circuitry 404 (FIG. 4) receives a request from a user to view a plurality of media asset identifiers. For the example, the user may request to viewer media asset identifiers that represent various movies. In this case, the media asset identifier may be a poster of movie, album art of a song, or cover of a game. The media asset identifier may also simply be the name of the media asset.

At step 904, control circuitry 404 (FIG. 4) receives a selection by the user of a media asset identifier of the plurality of media asset identifiers. For example, the user may select one of the media asset identifiers from the plurality of media asset identifiers and control circuitry 404 may receive the selection via I/O Path 402. Suppose that the user chooses to view "Jurassic Park" and selects a "Jurassic Park" movie poster, which is the media asset identifier.

At step 906, control circuitry 404 (FIG. 4) access a first list of subscription services with which the user has an account registered. For example, control circuitry 404 may refer to a user profile in storage 408 that contains a credentials database which lists the subscription services that the user is subscribed to and their respective access credentials. Control circuitry 404 may determine that the list includes Amazon Prime Video and Hulu, thus indicating that the user has accounts registered with the two subscription services.

At step 908, control circuitry 404 (FIG. 4) searches content available from each subscription service in the first list of subscription services to determine whether the content includes a media asset associated with the selected media asset identifier. Suppose that the media asset is the movie "Jurassic Park." Control circuitry 404 may retrieve library information about each subscription service in the list of subscription services from the media guidance data source 518 (FIG. 5). The library information may include a list of all media assets that are accessible to users with registered accounts with the subscription service. For example, control circuitry 404 may retrieve a list of media assets accessible on Amazon Prime Video. Control circuitry 404 may then search for "Jurassic Park" in the list of media assets accessible on Amazon Prime Video. Control circuitry 404 may repeat this process for Hulu, the second subscription service that the user has an account registered with.

At step 910, control circuitry 404 (FIG. 4) determines whether the content available from any subscription service in the list of subscription services includes the media asset. For example, control circuitry 404 may search for "Jurassic Park" in the list of media assets accessible on Amazon Prime Video and Hulu. If control circuitry 404 finds the media asset in Amazon Prime Video or Hulu, subscription services that the user has access credentials for, control circuitry 404 (FIG. 4) retrieves the media asset from a database provided by the subscription service, using access credentials of the account of the user at step 928. For example, control circuitry 404 may retrieve "Jurassic Park" from the Amazon Prime Video movie database (e.g., media content source 516 (FIG. 5)), using the user's access credentials.

At step 912, in response to determining that the content available from each subscription service in the first list of subscription services does not include the media asset, control circuitry 404 (FIG. 4) accesses a second list of subscription services with which a friend, with whom the user is connected by way of a social network platform, has an account registered. For example, control circuitry 404 may determine that "Jurassic Park" is not in the content available in Amazon Prime Video or Hulu. As a result, control circuitry 404 may refer to the viewing history database, which includes information about the viewing history of users and information about each user's friends. The viewing history database may also include a list of subscription services for each user. The list of subscription services in the viewing history database may be updated from the list of subscription services stored locally in the user profile of the user's device. Control circuitry 404 may identify a friend from the user's friends table in the viewing history database. For example, the media guidance application may identify viewer B and retrieve viewer B's list of subscription services. Suppose that viewer B's list of subscription services includes the services, Netflix and Epic.

At step 914, control circuitry 404 (FIG. 4) may search content available from each subscription service in the second list of subscription services to determine whether the content includes the media. For example, control circuitry 404 may retrieve a list of media assets associated with the subscription services in the second list from the media guidance data source 518 (FIG. 5). In this case, control circuitry 404 may retrieve the list of media assets accessible on Netflix and the list of media assets accessible on Epic, and may search for "Jurassic Park" in each respective second list.

At step 916, control circuitry 404 (FIG. 4) determines whether the content available from any subscription service in the second list of subscription services includes the media asset. For example, control circuitry 404 may search for "Jurassic Park" in the list of media assets accessible on Netflix and Epic.

Suppose control circuitry 404 (FIG. 4) finds the media asset in Netflix or Epic, subscription services that the user's friend has access credentials for, control circuitry 404 (FIG. 4). At step 920, control circuitry 404 generates for display to the user, a selectable option to query the friend for access to the given subscription service. For example, the media guidance application may determine that "Jurassic Park" is accessible on Netflix. Control circuitry 404 may inform the user that viewer B has a subscription to Netflix and generate a selectable option on display 412 (FIG. 4) of the user's local device to query whether the user wants to request permission, from viewer B, to share the subscription to Netflix.

At step 922, control circuitry 404 (FIG. 4) determines whether a selection from the user of the selectable option to query the friend for access has been received. For example, control circuitry 404 (FIG. 4) may survey whether a response has been provided by the user through I/O Path 402. Upon determining that a response has been received, control circuitry 404 may parse the response and execute accordingly.

Suppose that the user chooses not to query a friend for access credentials. Alternatively, suppose that none of the user's friends have subscriptions to the subscription services that provide access to the media asset. In response, the process enters step 918, where control circuitry 404 (FIG. 4) provides the user with an option on display 412 to subscribe to the subscription service. For example, control circuitry 404 may generate a prompt that allows the user to create a Netflix account.

At step 924, in response to receiving a selection from the user of the selectable option to query the friend for access, control circuitry 404 (FIG. 4) receives from the friend, access credentials, corresponding to the account of the friend with the given subscription service to authorize the user to access the media asset through the account with the given subscription service. For example, control circuitry 404 may generate a selectable option for viewer B to share the access credentials associated with Netflix with the user's local device. Control circuitry 404 on the user's device may communicate with control circuitry 404 on viewer B's device over communications network 514 (FIG. 5). Control circuitry 404 on the user's device may generate a request, on display 412, to allow the user access to the friend's Netflix account. In the case that viewer B decides to share his Netflix account with the user, viewer B may select the selectable option to permit the user to access viewer B's registered account with the subscription service (e.g., share access credentials with the user's local device). Control circuitry 404, on the user's local device, may then receive this selection of the selectable option.

In some embodiments, control circuitry 404 (FIG. 4) may determine that the friend of the user does not subscribe to any of the subscription services that provide access to the media asset. However, control circuitry 404 may determine that the viewing history database indicates that the friend viewed the media asset on broadcast television. For example, the friend may have seen "Jurassic Park" when it was transmitted on the FOX, a television channel. Control circuitry 404 on the user's device may query control circuitry 404 on the friend's device to determine if the friend captured the media asset on through a digital video recorder (e.g., TiVo). Control circuitry 404 on the friend's device may search through the saved media assets in the friend's device in storage 408 for the media asset requested by the user. Upon finding the media asset, control circuitry 404 on the friend's device may generate a prompt on display 412 of the friend's device, requesting permission to send the stored media asset to the user. If the friend accepts the request (e.g., via I/O Path 402 (FIG. 4)), control circuitry 404 on the friend's device may send the media asset to the user's device over communications network 514 (FIG. 5).

At step 926, control circuitry 404 (FIG. 4) generates for display to the user, the media asset based on receiving the access credentials from the friend. Upon receiving access credentials, control circuitry 404 may retrieve "Jurassic Park" from Netflix's movie database (e.g., from the media content source 516 (FIG. 5)) and present it to the user for viewing on display 412 of the user's local device. It should be noted that viewer B's access credentials, including username and password, are not shared with the user and remain private to viewer B.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 9.

Figure 10:
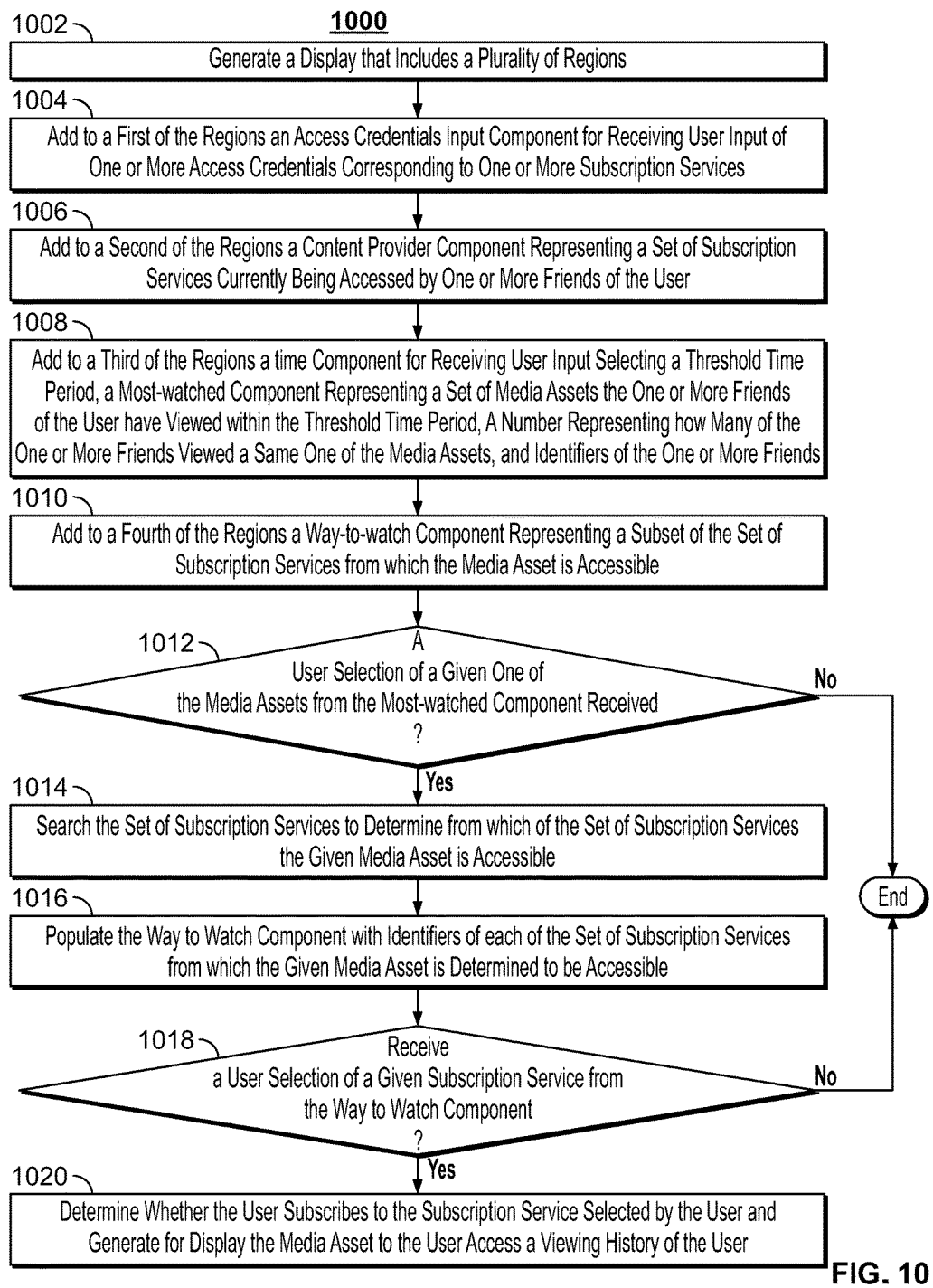
FIG. 10 is a flowchart of a detailed illustrative process for generating a display that includes a plurality of regions, in accordance with some embodiments of the disclosure.

FIG. 10 is a flowchart of illustrative steps of a process 1000 for generating a display that includes a plurality of regions, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to generate a display that includes a plurality of regions. In addition, one or more steps of process 1000 may be incorporated into or combined with one or more steps of any other process or embodiment (e.g., as described in relation to FIGS. 1, 6-9 and 11-13).

At step 1002, control circuitry 404 (FIG. 4) generates a display that includes a plurality of regions. The display may be user input interface 410 presented on display 412. In some embodiments, the display may resemble display screen 100 depicted in FIG. 1.

At step 1004, control circuitry 404 (FIG. 4) adds to a first of the regions, an access credentials input component for receiving user input of one or more access credentials corresponding to one or more subscription services. For example, the first of the regions may feature I/O Path 402 which specifically allows the user to insert access credentials to "login" and access an account associated with a subscription service. The access credentials may be a username and a password combination. In some embodiments, the media control circuitry 404 may store the access credentials in a credentials database in storage 408 and may list the accounts accessible to the user in the first of the regions. For example, the first of the regions may include a dropdown menu that lists several accounts associated with their respective access credentials. The user may select the accounts that he/she wishes to access through I/O Path 402. For example, the dropdown menu may list three accounts associated with the user, viewer A, and viewer B. Control circuitry 404 may receive user input to select one of the accounts listed (e.g., Hulu) and the associated access credentials. Control circuitry 404 may then retrieve the access credentials from the credentials database.

At step 1006, control circuitry 404 (FIG. 4) adds to a second of the regions, a content provider component representing a set of subscription services currently being accessed by one or more friends of the user. For example, the second of the regions may list content providers associated with subscription services being accessed by friend(s) of the user. Suppose that the subscription services being accessed by the user's friends, as listed in the viewing history database, are Netflix, Amazon Prime Video, Hulu, Spotify, HBO Now, and cable. The content providers of these subscription services may be Netflix, Amazon, Hulu, Spotify, HBO, and TiVo respectively. Control circuitry 404 may retrieve the names of the content providers from the viewing history database, and list them in the second of the regions under the content provider component.

At step 1008, control circuitry 404 (FIG. 4) adds to a third of the regions, a time component for receiving user input selecting a threshold time period, a most-watched component representing a set of media assets that one or more friends of the user have viewed within the threshold time period, a number representing the number of one of more friends that viewed a media asset, and identifiers of the one or more friends. The threshold time period may be a specific window of time (e.g., past day, past week, between Oct. 1, 2017 and Oct. 15, 2017, etc.) for which control circuitry 404 may determine the most watched media assets among the user's friends. For example, control circuitry 404 may receive user input to set the threshold time period to "this past week" through I/O Path 402. Accordingly, control circuitry 404 may determine the media assets viewed by the friends of the user between the current time and a week prior. Upon generating a list of the most viewed media assets based on the viewing history database, and determining the users that watched the viewed the media assets, control circuitry 404 may display the list in the third of the regions. Control circuitry 404 may also list a number representing how many of the one or more friends viewed a same one of the media assets, and identifiers of the one or more friends. For example, control circuitry 404 may determine how many friends viewed a media asset and list the number in third of the regions, alongside the media asset name and identifiers (e.g., names, profile pictures) of the user's friends.

At step 1010, control circuitry 404 (FIG. 4) adds to a fourth of the regions a way-to-watch component representing a subset of the set of subscription services from which the media asset is accessible. The fourth of the regions may list the subscription services that provide access to the media assets listed in the most-watched component. For example, the most-watched component may list "Jurassic Park." If the user desires to view "Jurassic Park," the way-to-watch component may display the subscriptions services that provide access to "Jurassic Park."

Suppose the user wishes to select one of the media assets listed in the third of the regions. At step 1012, control circuitry 404 (FIG. 4) determines whether a user selection of a given one of the media assets from the most-watched component has been received. For example, control circuitry 404 may survey I/O Path 402 to determine whether the user has made a selection. If a response is not given, control circuitry 404 may remain idle.

At step 1014, control circuitry 404 may receive user input selecting one of the media assets through I/O Path 402 (FIG. 4). In response, control circuitry 404 searches the set of subscription services to determine from which of the set of subscription services the given media asset is accessible. Control circuitry 404 may search content available from each subscription service in the set of subscription services to determine whether the content includes the media. For example, control circuitry 404 may retrieve a list of media assets associated with the subscription services in the set from the media guidance data source 518 (FIG. 5). In this case, control circuitry 404 may retrieve the list of media assets accessible the various subscription services in the set, and may search for "Jurassic Park" in each respective list.

At step 1016, control circuitry 404 (FIG. 4) populates the way-to-watch component with identifiers of each of the set of subscription services from which the given media asset is determined to be accessible. For example, based on the search results from step 1014, control circuitry 404 may determine that Netflix and Epic feature "Jurassic Park" in their respective lists of media assets. Thus, control circuitry 404 may list Netflix and Epic in the way-to-watch component on display 412 of the user's device.

At step 1018, control circuitry 404 (FIG. 4) determines whether a user selection of a given subscription service from the way-to-watch component has been received. For example, control circuitry 404 may survey I/O Path 402 to determine whether the user has made a selection. If a response is not given, control circuitry 404 may remain idle.

If a user selection has been received, control circuitry 404 (FIG. 4) determines whether the user subscribes to the subscription service selected by the user and generates for display the media asset to the user at step 1020. For example, control circuitry 404 may refer to the credentials database to determine whether the user has access credentials for the selected subscription service. If the user does have access credentials, control circuitry 404 may retrieve the media asset from the database of the subscription service, and generate for display, the media asset to the user.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 10.

Figure 11:
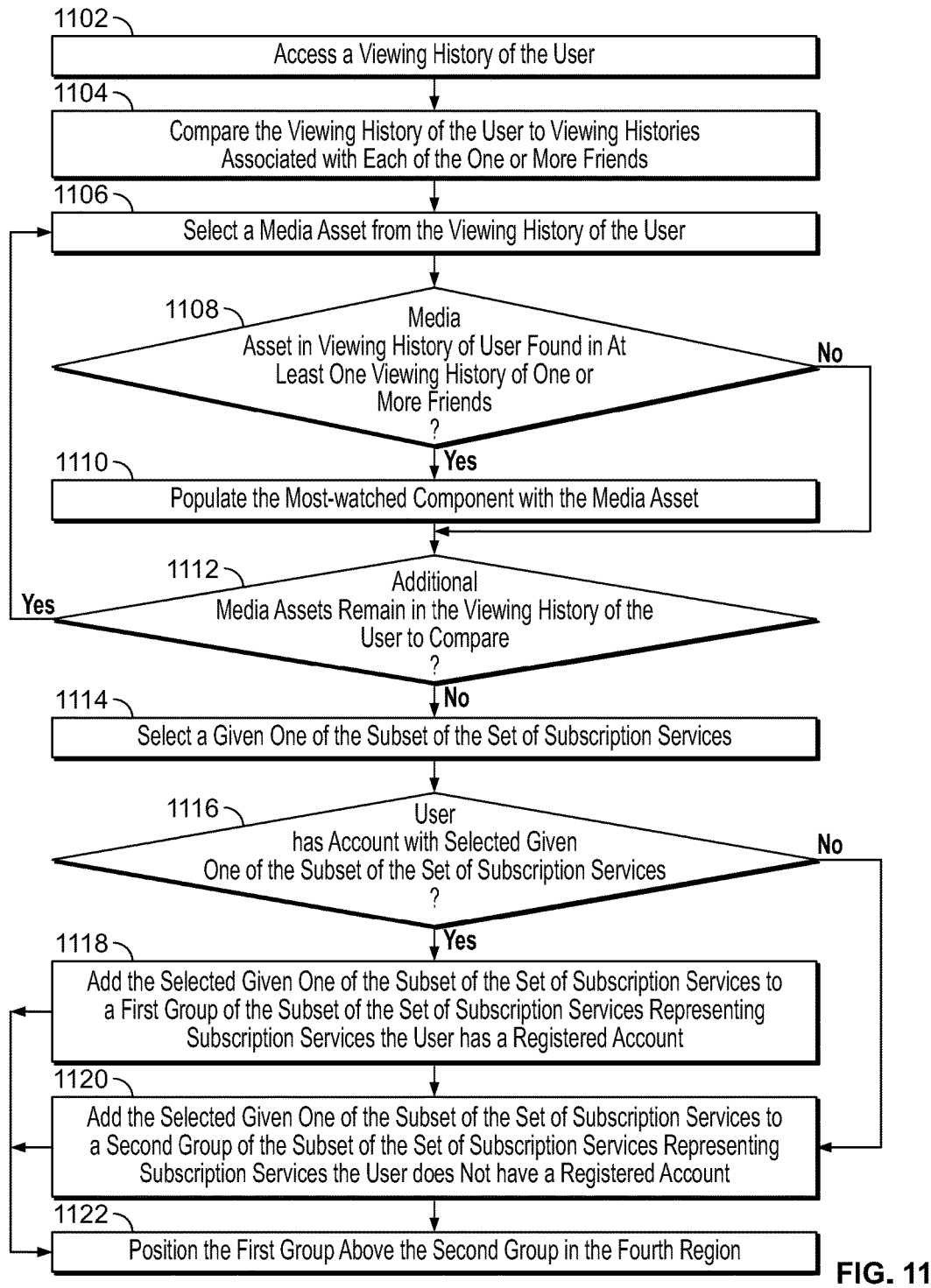
FIG. 11 is a flowchart of a detailed illustrative process for populating the components in the plurality of regions, in accordance with some embodiments of the disclosure.

FIG. 11 is a flowchart of illustrative steps of a process 1100 for populating the components in the plurality of regions, in accordance with some embodiments of the disclosure. It should be noted that process 1100 or any step thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to populate the components in the plurality of regions. In addition, one or more steps of process 1100 may be incorporated into or combined with one or more steps of any other process or embodiment (e.g., as described in relation to FIGS. 1, 6-10 and 12-13).

At step 1102, control circuitry 404 (FIG. 4) accesses a viewing history of the user. For example, control circuitry 404 may refer to the viewing history database of the user at a remote server to access the viewing history of the user. The viewing history of the user may also be found locally in the user profile in storage 408.

At step 1104, control circuitry 404 (FIG. 4) compares the viewing history of the user to viewing histories associated with each of the one or more friends. For example, control circuitry 404 may refer to the viewing history database of all users and compare the viewing history of the user, with the viewing histories of his/her friends (e.g., other users found in the user's friends table in the viewing history database).

At step 1106, control circuitry 404 (FIG. 4) selects a media asset from the viewing history of the user. For example, control circuitry 404 may select "Mission Impossible," a movie present in the viewing history of the user.

At step 1108, control circuitry 404 (FIG. 4) determines whether the media asset in viewing history of user is found in at least one viewing history of one or more friends. For example, control circuitry 404 may search for "Mission Impossible" in the viewing history of each user listed in the user's friends table in the viewing history database.

At step 1110, in response to determining that the media asset is found in the viewing history of one or more friends, control circuitry 404 populates the most-watched component with the media asset. For example, control circuitry 404 may include "Mission Impossible" in the most-watched component of the third of the regions displayed to the user.

At step 1112, in response to determining that the media asset is either not found in the viewing history of one or more friends, or the media asset has been populated in step 1110, control circuitry 404 determines whether additional media assets remain in the viewing history of the user to compare. For example, control circuitry 404 may determine, based on the user's viewing history, that the user has viewed the movies "Mission Impossible," "Aladdin," and "Inception." Having already processed "Mission Impossible" between steps 1106 and 1110, control circuitry 404 may determine that two additional media assets remain. In response, control circuitry 404 may return to step 1106 and select "Aladdin." Upon reaching step 1112 again, control circuitry 404 may determine that one additional media asset remains. Accordingly, the process returns to step 1106 and control circuitry 404 selects "Inception." This loop may repeat until the user has compared all media assets in the user's viewing history with the viewing histories of each of the user's friends.

At step 1114, in response to determining that no additional media assets remain to compare, control circuitry 404 (FIG. 4) selects a given one of the subset of the set of subscription services. The subset of the set of subscription services corresponds to the subscription services that are displayed in way-to-watch component. As discussed previously, the way-to-watch component includes the subscription services that provide access to a media asset in the most-watched component. Suppose that the subset includes Netflix, Amazon Prime Video, Hulu, and Epic. Control circuitry 404 may select a given one (e.g., Amazon Prime Video).

At step 1116, control circuitry 404 (FIG. 4) determines whether the user has an account with the selected given one of the subset of the set of subscription services. For example, control circuitry 404 determines from the user's credentials database in storage 408, the access credentials the user has. Control circuitry 404 may further determine if the selected given one, Amazon Prime Video, is listed in the credentials database as a subscription service that the user has access credentials for.

At step 1118, in response to determining that the user has an account with the selected given one, control circuitry 404 adds the selected given one of the subset of the set of subscription services to a first group of the subset of the set of subscription services representing subscription services for which the user has a registered account. For example, control circuitry 404 may add Amazon Prime Video in the first group.

At step 1120, in response to determining that the user does not have an account with the selected given one, control circuitry 404 adds the selected given one of the subset of the set of subscription services to a second group of the subset of the set of subscription services representing subscription services for which the user does not have a registered account. Suppose that the user does not have an account with any other subscription service in the subset. As a result, control circuitry 404 may add Netflix, Hulu and Epic in the second group.

At step 1122, control circuitry 404 (FIG. 4) positions the first group above the second group in the fourth of the regions. For example, the subset of the set of subscription services may include Netflix, Amazon Prime Video, Hulu and Epic. Upon determining that Amazon Prime Video is in the first group while Netflix, Hulu and Epic are in the second group, when generating for display the forth of the regions on display 412, control circuitry 404 may place Amazon Prime Video above Netflix, Hulu and Epic.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 11.

Figure 12:
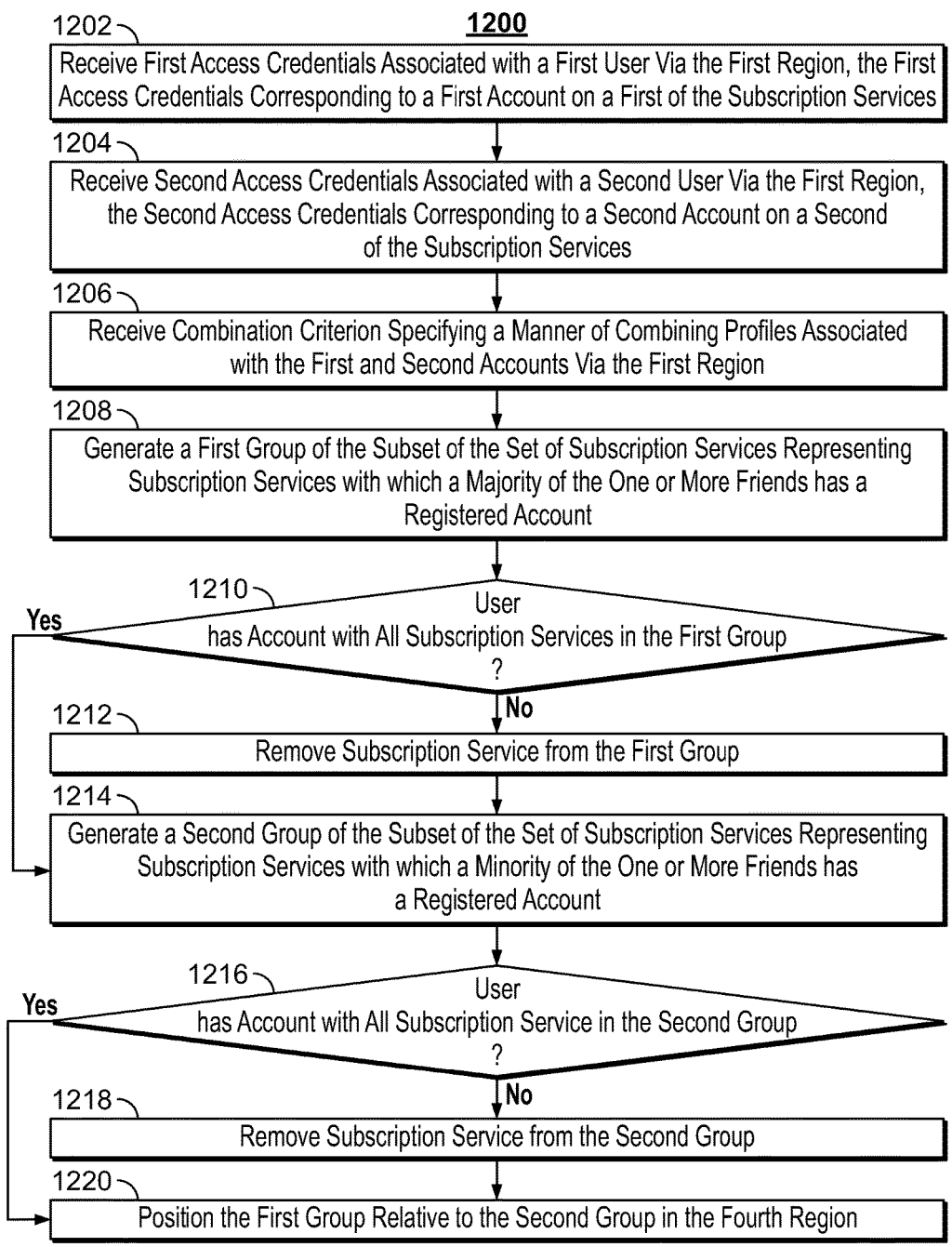
FIG. 12 is a flowchart of a detailed illustrative process for organizing the components in the plurality of regions, in accordance with some embodiments of the disclosure.

FIG. 12 is a flowchart of illustrative steps of a process 1200 for organizing the components in the plurality of regions, in accordance with some embodiments of the disclosure. It should be noted that process 1200 or any step thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5)) in order to organize the components in the plurality of regions. In addition, one or more steps of process 1200 may be incorporated into or combined with one or more steps of any other process or embodiment (e.g., as described in relation to FIGS. 1, 6-11 and 13).

At step 1202, control circuitry 404 (FIG. 4) receives first access credentials associated with a first user via the first of the regions, the first access credentials corresponding to a first account on a first of the subscription services. For example, control circuitry 404 may receive access credentials (e.g., username and password) associated with a first account (e.g., the first user's account on the local device) on a first subscription service (e.g., Amazon Prime Video) through I/O Path 402.

At step 1204, control circuitry 404 (FIG. 4) receives second access credentials associated with a second user via the first of the regions, the second access credentials corresponding to a second account on a second of the subscription services. For example, control circuitry 404 may receive access credentials (e.g., username and password) associated with a second account (e.g., belonging to a second user of the first user's device) on a second subscription service (e.g., Netflix).

At step 1206, control circuitry 404 (FIG. 4) combination criterion specifying a manner of combining profiles associated with the first and second accounts via the first of the regions. In this case, the media guidance application would generate the third of the regions based on a combination of friends, preferences and viewing history, of the users. The users may adjust logic settings of the media guidance application. The logic settings may be adjustable OR, AND, ONLY values for different criteria. For example, the logic setting for which friends to consider when generating the tracking table may indicate "friends of first user AND second user." In this case, control circuitry 404 may retrieve the viewing histories of all shared/mutual friends of the two users to determine view counts and subscription services. Alternatively, the logic setting "friends of first user OR second user" allows control circuitry 404 to consider all friends associated with the two users to determine view counts and subscription services. The logic setting "friends of first user ONLY" allows control circuitry 404 to consider only the friends of the first user to determine view counts and subscription services.

The logic settings may also be adjustable for the media assets viewed. For example, when presenting the most watched media assets in the third of the regions, control circuitry 404 may generate the tracking table. In particular, if the logic setting states "ignore media assets viewed by first user AND second user," control circuitry 404 will remove media assets that both users have already viewed. If the logic setting states "ignore media assets viewed by first user OR second user," control circuitry 404 will remove any media asset from the tracking table if at least one of the users has viewed the media asset. If the logic setting states "ignore media assets viewed by first user ONLY," control circuitry 404 will remove the media assets that the first user has already viewed.

The fourth of the regions may also be organized based on logic settings for subscription services. Suppose that the logic setting states "rank by preferred subscription services of first user AND second user." In this case, control circuitry 404 may refer to the viewing history database of both users and count the number of times each subscription service is used to access a media asset. For example, control circuitry 404 may determine that during the threshold time period, Netflix was used by 10 times by the first user and 13 times by the second user. In addition, Hulu was used 5 times by the first user and 15 times by the second user. Thus, Netflix was used 23 times and Hulu was used 20 times. In response, control circuitry 404 may list Netflix above Hulu in the fourth of the regions. If the logic setting states "rank by preferred subscription services of first user OR second user," control circuitry 404 may simply determine which subscription service was used the most by either user. In this example, control circuitry 404 may list Hulu above Netflix in the fourth of the regions because Hulu was used the most amongst any user (e.g., 15 times by second user).

At step 1208, control circuitry 404 (FIG. 4) generates a first group of the subset of the set of subscription services representing subscription services with which a majority of the one or more friends has a registered account. For example, control circuitry 404 may determine that the user has five friends listed in the user's friends table of the viewing history database. Suppose that all five friends watched the media asset "Jurassic Park." Control circuitry 404 may determine that at least three of the friends (e.g., the majority) accessed "Jurassic Park" using Netflix and Amazon Prime Video, which are subscription services in the subset. Therefore, control circuitry 404 may identify Netflix and Amazon Prime Video as the first group.

At step 1210, control circuitry 404 (FIG. 4) determines whether the user has an account with all of the subscription services in the first group. For example, control circuitry 404 may refer to the user profile in storage 408 to retrieve the user's credentials database. Control circuitry 404 may then check whether the subscription services in the first group are subscription services that the user has access credentials for. Suppose that the user subscribes to Amazon Prime Video and Hulu. Control circuitry 404 may determine that Amazon Prime Video, a service in the first group, is also in the user's credentials database. However, Netflix is not in the user's credentials database.

At step 1212, in response to determining that the user does not subscribe to all of the subscription services in the first group, control circuitry 404 (FIG. 4) removes the subscription services from the first group that the user does not subscribe to. For example, control circuitry 404 may remove Netflix from the first group.

At step 1214, control circuitry 404 (FIG. 4) generates a second group of the subset of the set of subscription services representing subscription services with which a minority of the one or more friends has a registered account. For example, control circuitry 404 may determine that the user has five friends listed in the user's friends table of the viewing history database. Suppose that all five friends watched the media asset "Jurassic Park." Control circuitry 404 may determine that at most two of the friends (e.g., the minority) accessed the media asset (e.g., Jurassic Park) using Hulu and Epic, which are subscription services in the subset. Therefore, control circuitry 404 may identify Epic and Hulu as the second group.

At step 1216, control circuitry 404 (FIG. 4) determines whether the user has an account with all of the subscription services in the second group. For example, control circuitry 404 may refer to the user profile in storage 408 to retrieve the user's credentials database. Control circuitry 404 may then check whether the subscription services in the second group are subscription services that the user has access credentials for. Suppose that the user subscribes to Amazon Prime Video and Hulu. Control circuitry 404 may determine that Hulu, a service in the second group, is also in the user's credentials database. However, Epic is not in the user's credentials database.

At step 1218, in response to determining that the user does not subscribe to all of the subscription services in the second group, control circuitry 404 (FIG. 4) removes the subscription services from the second group that the user does not subscribe to. For example, control circuitry 404 may remove Epic from the second group.

At step 1220, control circuitry 404 (FIG. 4) positions the first group relative to the second group in the fourth of the regions. For example, control circuitry 404 may place the first group above the second group, because the user may prefer to view the media asset "Jurassic Park" on a subscription service that a majority of his/her friends viewed the media asset on. Thus, control circuitry 404 may generate for display the fourth of the regions to the user with Amazon Prime Video above Hulu on display 412.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 12.

Figure 13:
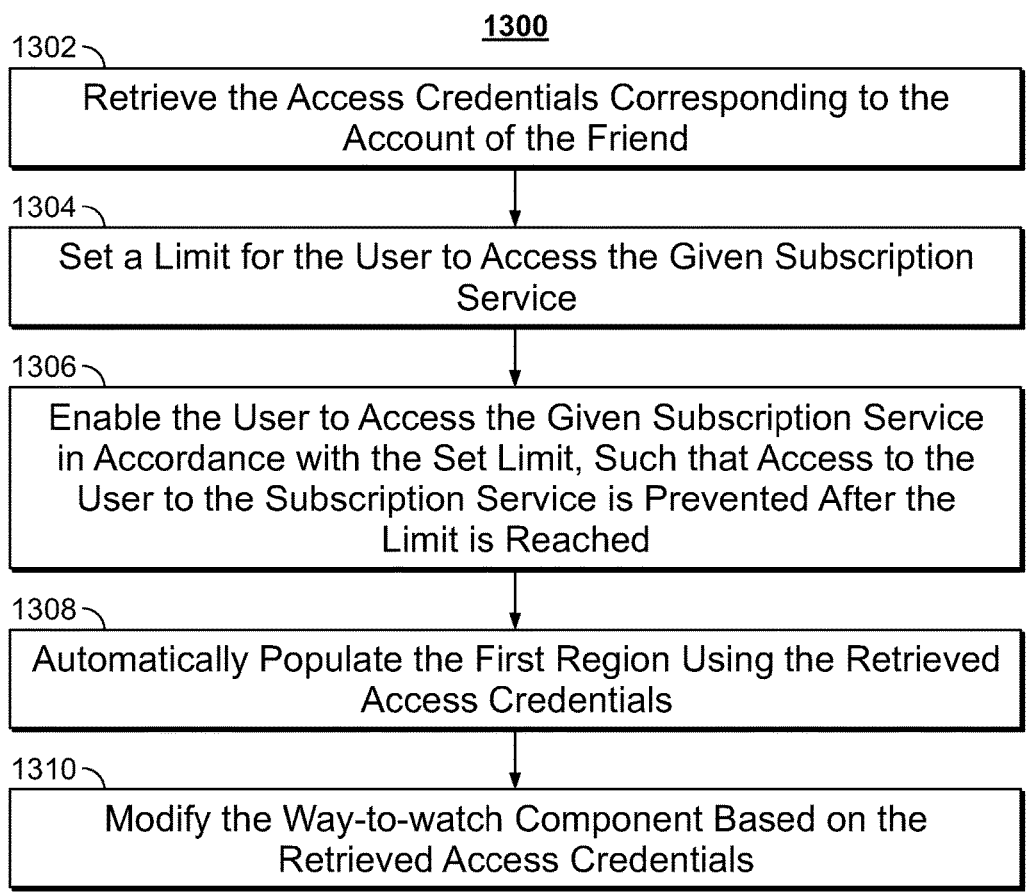
FIG. 13 is a flowchart of a detailed illustrative process for modifying the way-to-watch component based on the retrieved access credentials, in accordance with some embodiments of the disclosure.

FIG. 13 is a flowchart of illustrative steps of a process 1300 for modifying the way-to-watch component based on the retrieved access credentials, in accordance with some embodiments of the disclosure. It should be noted that process 1300 or any step thereof could be performed on, or provided by, any of the devices shown in FIGS. 4-5. For example, process 1300 may be executed by control circuitry 404 (FIG. 4) as instructed by a media guidance application implemented on a user device (e.g., user equipment devices 502, 504, and/or 506 (FIG. 5)) in order to modify the way-to-watch component based on the retrieved access credentials. In addition, one or more steps of process 1300 may be incorporated into or combined with one or more steps of any other process or embodiment (e.g., as described in relation to FIGS. 1 and 6-12).

At step 1302, control circuitry 404 (FIG. 4) retrieves the access credentials corresponding to the account of the friend. For example, control circuitry 404 may generate a request on the friend's local device, requesting permission for the user to access the media asset on the subscription service the friend possesses access credentials for. Following the overarching example, the media guidance application may specifically request access credentials for the friend's Netflix account in order for the user to watch "Jurassic Park." For example, control circuitry 404 on the user's device may communicate with control circuitry 404 on the friend's device over communications network 514 (FIG. 5). Control circuitry 404 on the user's device may generate a request, on display 412, to allow the user access to the friend's Netflix account. In response to the friend accepting to share access credentials, control circuitry 404 may retrieve the access credentials from the friend's storage 408 on the friend's device.

At step 1304, control circuitry 404 (FIG. 4) sets a limit for the user to access the given subscription service. For example, the user's friend may grant the user access to the given subscription service. Since the access credentials are not originally the user's, control circuitry 404 on the friend's device may set a time limit or access limit to the user's access of the given subscription service. Suppose that the user is given access to Netflix. Control circuitry 404 on the friend's device may allow the user to only access one media asset or may grant access to the user for only 24 hours.

At step 1306, control circuitry 404 (FIG. 4) on the user's device enables the user to access the given subscription service in accordance with the set limit, such that access to the user to the subscription service is prevented after the limit is reached. For example, control circuitry 404 may generate for display the media asset to the user on display 412. If the limit is an access limit, once the user completes watching the media asset, control circuitry 404 may prevent the user from using the access credentials of the friend until the user receives permission from the friend again. Similarly, if the limit is a time limit (e.g., 24 hours), once 24 hours have passed from the first time the access credentials were used by the user, control circuitry 404 may prevent the user from using the access credentials of the friend until the user receives permission from the friend again.

At step 1308, control circuitry 404 (FIG. 4) automatically populates the first of the regions using the retrieved access credentials. As mentioned previously, the first of the regions includes an access credentials input component. Thus, in this case, control circuitry 404 automatically provides the access credentials to the input component.

Once the user has access to the media asset, control circuitry 404 (FIG. 4) modifies the way-to-watch component, based on the retrieved access credentials. For example, control circuitry 404 may receive access credentials to Netflix. Accordingly, control circuitry 404 may place Netflix above the other subscription services in the way-to-watch component on display 412.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 4-5 could be used to perform one or more of the steps in FIG. 13.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for sharing access to a subscription service that provides a user selected media asset, the method comprising:

generating, for display, a graphical user interface comprising (1) a plurality of media asset identifiers for media assets that one or more friends of a user have viewed within a threshold time period and (2) a representation of how many of the one or more friends viewed a same one of the media assets;

receiving a selection by the user of a media asset identifier of the plurality of media asset identifiers;

accessing a first list of subscription services with which the user has an account registered;

searching content available from each subscription service in the first list of subscription services to determine whether the content includes a media asset associated with the selected media asset identifier;

in response to determining that the content available from each subscription service in the first list of subscription services does not include the media asset, accessing a second list of subscription services with which a friend, with whom the user is connected by way of a social network platform, has an account registered;

searching content available from each subscription service in the second list of subscription services to determine whether the content includes the media asset;

in response to determining that the content available from a given subscription service in the second list of subscription services includes the media asset, generating for display to the user a selectable option to query the friend for access to the given subscription service;

in response to receiving a selection from the user of the selectable option to query the friend for access, receiving, from the friend, access credentials corresponding to the account of the friend with the given subscription service to authorize the user to access the media asset through the account with the given subscription service; and generating for display, to the user, the media asset based on receiving the access credentials from the friend.

2. The method of claim 1 further comprising:

generating a display that includes a plurality of regions, wherein:
- a first of the regions includes an access credentials input component for receiving user input of one or more access credentials corresponding to one or more subscription services;
- a second of the regions includes a content provider component representing a set of subscription services currently being accessed by one or more friends of the user;
- a third of the regions includes:
  - a time component for receiving user input selecting the threshold time period; and
  - a most-watched component comprising the plurality of media asset identifiers, the representation of how many of the one or more friends viewed the same one of the media assets, and identifiers of the one or more friends; and
- a fourth of the regions includes a way-to-watch component representing a subset of the set of subscription services from which the media asset is accessible.

3. The method of claim 2 further comprising:

receiving a user selection of a given one of the media assets from the most-watched component;

in response to receiving the user selection of the given one of the media assets, searching the set of subscription services to determine from which of the set of subscription services the given media asset is accessible; and populating the way-to-watch component with identifiers of each of the set of subscription services from which the given media asset is determined to be accessible.

4. The method of claim 3, wherein searching the content available from each subscription service in the list of subscription services is performed in response to receiving a user selection of a given subscription service from the way-to-watch component.

5. The method of claim 2 further comprising:

accessing a viewing history of the user;

comparing the viewing history of the user to viewing histories associated with each of the one or more friends; and based on the comparing, populating the most-watched component by identifying media assets in the viewing histories of the one or more friends for which there is no matching media asset in the viewing history of the user.

6. The method of claim 2 further comprising:

determining which of the subset of the set of subscription services the user has a registered account;

generating a first group of the subset of the set of subscription services representing subscription services the user has a registered account and a second group of the subset of the set of subscription services representing subscription services the user does not have a registered account; and positioning the first group above the second group in the fourth of the regions.

7. The method of claim 2 further comprising:

receiving first access credentials associated with a first user via the first of the regions, the first access credentials corresponding to a first account on a first of the subscription services;

receiving second access credentials associated with a second user via the first of the regions, the second access credentials corresponding to a second account on a second of the subscription services; and receiving combination criterion specifying a manner of combining profiles associated with the first and second accounts via the first of the regions.

8. The method of claim 2 further comprising:

generating a first group of the subset of the set of subscription services representing subscription services with which a majority of the one or more friends has a registered account and a second group of the subset of the set of subscription services representing subscription services with which a minority of the one or more friends has a registered account; and positioning the first group relative to the second group in the fourth of the regions.

9. The method of claim 2 further comprising:

generating a first group of the set of subscription services representing subscription services with which a majority of the one or more friends and the user has a registered account and a second group of the subset of the set of subscription services representing subscription services with which a minority of the one or more friends and the user has a registered account; and positioning the first group relative to the second group in the second of the regions.

10. The method of claim 1, wherein receiving from the friend access credentials comprises:

setting a limit for the user to access the given subscription service;

enabling the user to access the given subscription service in accordance with the set limit, such that access to the user to the subscription service is prevented after the limit is reached.

11. A system for sharing access to a subscription service that provides a user selected media asset, the system comprising:

control circuitry configured to:
- generate, for display, a graphical user interface comprising (1) a plurality of media asset identifiers for media assets that one or more friends of a user have viewed within a threshold time period and (2) a representation of how many of the one or more friends viewed a same one of the media assets;
- receive a selection by the user of a media asset identifier of the plurality of media asset identifiers;
- access a first list of subscription services with which the user has an account registered;
- search content available from each subscription service in the first list of subscription services to determine whether the content includes a media asset associated with the selected media asset identifier;
- in response to determining that the content available from each subscription service in the first list of subscription services does not include the media asset, access a second list of subscription services with which a friend, with whom the user is connected by way of a social network platform, has an account registered;
- search content available from each subscription service in the second list of subscription services to determine whether the content includes the media asset;

in response to determining that the content available from a given subscription service in the second list of subscription services includes the media asset, generate for display to the user a selectable option to query the friend for access to the given subscription service;

in response to receiving a selection from the user of the selectable option to query the friend for access, receive, from the friend, access credentials corresponding to the account of the friend with the given subscription service to authorize the user to access the media asset through the account with the given subscription service; and generate for display, to the user, the media asset based on receiving the access credentials from the friend.

12. The system of claim 11 wherein control circuitry is further configured to:

generate a display that includes a plurality of regions, wherein:
- a first of the regions includes an access credentials input component for receiving user input of one or more access credentials corresponding to one or more subscription services;
- a second of the regions includes a content provider component representing a set of subscription services currently being accessed by one or more friends of the user;
- a third of the regions includes:
  - a time component for receiving user input selecting the threshold time period; and
  - a most-watched component comprising the plurality of media asset identifiers, the representation of how many of the one or more friends viewed the same one of the media assets, and identifiers of the one or more friends; and
- a fourth of the regions includes a way-to-watch component representing a subset of the set of subscription services from which the media asset is accessible.

13. The system of claim 12 wherein control circuitry is further configured to:

receive a user selection of a given one of the media assets from the most-watched component;

in response to receiving the user selection of the given one of the media assets, search the set of subscription services to determine from which of the set of subscription services the given media asset is accessible; and populate the way-to-watch component with identifiers of each of the set of subscription services from which the given media asset is determined to be accessible.

14. The system of claim 13, wherein searching the content available from each subscription service in the list of subscription services is performed in response to receiving a user selection of a given subscription service from the way-to-watch component.

15. The system of claim 12 wherein control circuitry is further configured to:

access a viewing history of the user;

compare the viewing history of the user to viewing histories associated with each of the one or more friends; and based on the comparing, populate the most-watched component by identifying media assets in the viewing histories of the one or more friends for which there is no matching media asset in the viewing history of the user.

16. The system of claim 12 wherein control circuitry is further configured to:

determine which of the subset of the set of subscription services the user has a registered account;

generate a first group of the subset of the set of subscription services representing subscription services the user has a registered account and a second group of the subset of the set of subscription services representing subscription services the user does not have a registered account; and position the first group above the second group in the fourth of the regions.

17. The system of claim 12 wherein control circuitry is further configured to:

receive first access credentials associated with a first user via the first of the regions, the first access credentials corresponding to a first account on a first of the subscription services;

receive second access credentials associated with a second user via the first of the regions, the second access credentials corresponding to a second account on a second of the subscription services; and receive combination criterion specifying a manner of combining profiles associated with the first and second accounts via the first of the regions.

18. The system of claim 12 wherein control circuitry is further configured to:

generate a first group of the subset of the set of subscription services representing subscription services with which a majority of the one or more friends has a registered account and a second group of the subset of the set of subscription services representing subscription services with which a minority of the one or more friends has a registered account; and position the first group relative to the second group in the fourth of the regions.

19. The system of claim 12 wherein control circuitry is further configured to:

generate a first group of the set of subscription services representing subscription services with which a majority of the one or more friends and the user has a registered account and a second group of the subset of the set of subscription services representing subscription services with which a minority of the one or more friends and the user has a registered account; and position the first group relative to the second group in the second of the regions.

20. The system of claim 11, wherein receiving from the friend access credentials comprises:

setting a limit for the user to access the given subscription service;

enabling the user to access the given subscription service in accordance with the set limit, such that access to the user to the subscription service is prevented after the limit is reached.

* * * * *